US011419169B2

(12) United States Patent
Hosseini et al.

(10) Patent No.: US 11,419,169 B2
(45) Date of Patent: Aug. 16, 2022

(54) UPLINK POWER CONTROL FOR DUAL CONNECTIVITY

(71) Applicant: QUALCOMM Incorporated, San Diego, CA (US)

(72) Inventors: Seyedkianoush Hosseini, San Diego, CA (US); Peter Gaal, San Diego, CA (US); Peter Pui Lok Ang, San Diego, CA (US); Xiao Feng Wang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 16/824,511

(22) Filed: Mar. 19, 2020

(65) Prior Publication Data

US 2020/0305209 A1 Sep. 24, 2020

Related U.S. Application Data

(60) Provisional application No. 62/824,297, filed on Mar. 26, 2019, provisional application No. 62/822,030, filed on Mar. 21, 2019.

(51) Int. Cl.
*H04W 24/08* (2009.01)
*H04W 76/15* (2018.01)
(Continued)

(52) U.S. Cl.
CPC .......... *H04W 76/15* (2018.02); *H04L 5/0094* (2013.01); *H04W 8/24* (2013.01); *H04W 72/0473* (2013.01); *H04W 72/10* (2013.01)

(58) Field of Classification Search
None
See application file for complete search history.

(56) References Cited

U.S. PATENT DOCUMENTS 10,314,037 B2   6/2019  Chen et al.
2015/0201383 A1* 7/2015  Papasakellariou .. H04W 52/367
                                                    370/278

(Continued)

FOREIGN PATENT DOCUMENTS

CA        3025184 A1    1/2018
WO    WO-2018009595 A1  1/2018

OTHER PUBLICATIONS

Interdigital, et al., "Power Control for NR DC", 3GPP Draft; R1-1802574 (R15 NR WI AI 7163 NR DC UL PC), 3rd Generation Partnership Project (3GPP), Mobile Competence Centre ; 650, Route Des Lucioles ; F-06921 Sophia-Antipolis Cedex ; FRANCE, vol. RAN WG1, No. Athens, Greece; Feb. 26, 2018-Mar. 2, 2018, Feb. 16, 2018 (Feb. 16, 2018), pp. 1-6, XP051397483, Retrieved from the Internet: URL:http://www.3gpp.org/ftp/tsg%5Fran/WG1%5FRL1/TSGR1%5F92/Docs/ [retrieved on Feb. 16, 2018].

(Continued)

*Primary Examiner* — Brandon M Renner
(74) *Attorney, Agent, or Firm* — Holland & Hart, LLP

(57) ABSTRACT

Methods, systems, and devices for wireless communications are described. A user equipment (UE) may establish communications with a first base station and a second base station in accordance with a dual connectivity configuration. The UE may determine a second uplink timing gap for communications with the second base station and determine, based on being in the dual connectivity configuration, a first uplink timing gap for communications with the first base station. The first uplink timing gap may be determined to be greater than the second uplink timing gap. The UE may communicate with the first base station based on the first uplink timing gap. The UE may also prioritize uplink transmit power determinations for the first base station over (Continued)

uplink transmit power determinations for the second base station.

32 Claims, 21 Drawing Sheets

(51) Int. Cl.
*H04W 72/04* (2009.01)
*H04W 8/24* (2009.01)
*H04L 5/00* (2006.01)
*H04W 72/10* (2009.01)

(56) References Cited

U.S. PATENT DOCUMENTS

| | | | |
|---|---|---|---|
| 2016/0255593 A1 | 9/2016 | Blankenship et al. | |
| 2017/0048108 A1* | 2/2017 | Yi | H04W 24/08 |
| 2017/0201987 A1* | 7/2017 | Huang | H04W 16/32 |
| 2019/0386797 A1* | 12/2019 | Yang | H04L 27/2602 |
| 2020/0014523 A1* | 1/2020 | Huang | H04W 4/80 |
| 2020/0037184 A1* | 1/2020 | Harada | H04W 80/08 |
| 2020/0235866 A1* | 7/2020 | Liu | H04L 5/0094 |
| 2020/0275398 A1* | 8/2020 | Da | H04L 5/0048 |
| 2020/0305199 A1* | 9/2020 | Harada | H04W 74/0875 |
| 2021/0058884 A1* | 2/2021 | Liu | H04J 3/06 |
| 2021/0076230 A1* | 3/2021 | Chen | H04W 24/02 |

OTHER PUBLICATIONS

International Search Report and Written Opinion—PCT/US2020/023864—ISA/EPO—dated Jun. 16, 2020.

* cited by examiner

UPLINK POWER CONTROL FOR DUAL CONNECTIVITY

CROSS REFERENCE

The present application for patent claims the benefit of U.S. Provisional Patent Application No. 62/822,030 by HOSSEINI et al., entitled "UPLINK POWER CONTROL FOR DUAL CONNECTIVITY," filed Mar. 21, 2019, and to U.S. Provisional Patent Application No. 62/824,297 by HOSSEINI et al., entitled "UPLINK POWER CONTROL FOR DUAL CONNECTIVITY" filed Mar. 26, 2019, each of which is assigned to the assignee hereof, and each of which is expressly incorporated by reference herein.

BACKGROUND

The following relates generally to wireless communications, and more specifically to uplink power control for dual connectivity.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may communicate with two base stations in a dual connectivity configuration, where each base station of the dual connectivity configuration provides a cell group. The UE may be capable of communication with both cell groups simultaneously. The UE may have an uplink transmit power budget, which the UE cannot exceed for all uplink transmissions across the cell groups of the dual connectivity configuration.

SUMMARY

The described techniques relate to improved methods, systems, devices, and apparatuses that support uplink power control for dual connectivity implementations. Generally, the described techniques provide for giving higher priority to a master cell group (MCG) over a secondary cell group (SCG). A user equipment (UE) may be configured to communicate with two base stations according to a dual connectivity communications configuration. In the dual connectivity communications configuration, a first base station may provide the MCG, and a second base station may provide the SCG. In some cases, the UE may communicate with both of the base stations according to New Radio (NR) communications (e.g., NR-NR dual connectivity). The UE may support simultaneous transmission on both the MCG and the SCG. For example, while the UE transmits an uplink message on the MCG, the UE may be scheduled to begin transmitting an uplink message on the SCG. The UE may have an uplink transmit power limit for uplink transmissions across both cell groups of the dual connectivity configuration. When the UE transmits on the MCG and the SCG simultaneously, the UE may not be allowed to exceed an uplink transmit power limit for the total transmit power on the MCG and the SCG combined.

Therefore, UEs and base stations described herein may implement techniques for enhanced transmit power control in a dual connectivity configuration. For example, the MCG (e.g., communications with the MCG) may be slowed down and given increased priority over the SCG (e.g., communications with the SCG). Slowing down the MCG may refer to increasing a timing gap between when a downlink message is transmitted to a UE and when a corresponding uplink message is transmitted by the UE in response. The MCG may be given a higher priority, such that the transmit power for the SCG is selected after the transmit power for the MCG.

Some examples of timing gaps may be referred to as K timing gaps. A K timing gap may refer to, for example, a gap (delay, time, number of slots or other scheduling unit) between a UE receiving a downlink transmission (e.g., a downlink shared channel transmission or a downlink control channel transmission) and transmitting a corresponding uplink transmission (e.g., an acknowledgement, feedback, or other message prompted by the downlink shared channel transmission, or an uplink transmission scheduled by the downlink control channel transmission). For example, one example of a timing gap may be referred to as a K1 timing gap. The K1 timing gap may refer to the time (e.g., number of slots or other temporal or scheduling unit) between a base station transmitting a downlink data transmission to a UE and the UE transmitting a feedback message (e.g., HARQ feedback) in response. A second example of a timing gap may be referred to as a K2 timing gap. The K2 timing gap may refer to the time (e.g., number of slots or other temporal or scheduling unit) between a base station transmitting downlink control information to a UE and the UE transmitting an uplink shared channel message (e.g., an uplink data message) in response. To slow down the MCG, the UE and the base stations in the dual connectivity configuration may implement techniques to increase the size of a timing gap for MCG communications (e.g., K1, K2, or both), thereby increasing the time between a downlink message and corresponding uplink message exchanged between the UE and the MCG.

Other examples of timing gaps may be referred to as N timing gaps. An N timing gap may refer to, for example, a gap (delay, time, number of slots or other scheduling unit) between a UE determining a transmit power for an uplink transmission and transmitting the uplink transmission. For example, an N1 timing gap may refer to the time (e.g., number of slots or other temporal or scheduling unit) between a UE determining a transmit power for an uplink control channel transmission and the UE transmitting the uplink control channel transmission (e.g., a UE may wait until N1 symbols prior to transmitting the uplink control channel transmission to determine the transmit power thereof). As another example, an N2 timing gap may refer to the time (e.g., number of slots or other temporal or scheduling unit) between a UE determining a transmit power for an uplink control channel transmission and the UE transmitting the uplink data channel transmission (e.g., a UE may wait until N2 symbols prior to transmitting the uplink data channel transmission to determine the transmit power thereof). In general, techniques described herein in the context of a K timing gap may be applied in the context of an N timing gap, and vice versa, including setting one or more K timing gaps based on one or more N timing gaps and vice versa.

If communications with the MCG are slowed down, the MCG can achieve its required or desired power, and the uplink transmission powers of the SCG can then be adapted accordingly. An uplink transmit power for MCG uplink transmissions may be set ahead of time so that the UE may use an SCG uplink transmit power based on the earlier-set MCG uplink transmit power. To slow down the MCG, the UE and the base stations in the dual connectivity configuration may implement techniques to increase the size of a timing gap, such as K1, K2, or both, thereby increasing the time between a downlink message and corresponding uplink message. Various techniques for increasing the size of the MCG K1, MCG K2, or some other timing gap are described herein. Generally, an MCG timing gap (e.g., the MCG K1 and MCG K2) may be configured to be greater than some or all SCG timing gaps (e.g., the SCG K1 and SCG K2).

A method of wireless communications is described. The method may include establishing communications with a first base station and a second base station in accordance with a dual connectivity configuration, determining a second uplink timing gap for communications with the second base station, determining, based on being in the dual connectivity configuration, a first uplink timing gap for communications with the first base station, where the first uplink timing gap is determined to be greater than the second uplink timing gap, and communicating with the first base station based on the first uplink timing gap.

An apparatus for wireless communications is described. The apparatus may include a processor, memory in electronic communication with the processor, and instructions stored in the memory. The instructions may be executable by the processor to cause the apparatus to establish communications with a first base station and a second base station in accordance with a dual connectivity configuration, determine a second uplink timing gap for communications with the second base station, determine, based on being in the dual connectivity configuration, a first uplink timing gap for communications with the first base station, where the first uplink timing gap is determined to be greater than the second uplink timing gap, and communicate with the first base station based on the first uplink timing gap.

Another apparatus for wireless communications is described. The apparatus may include means for establishing communications with a first base station and a second base station in accordance with a dual connectivity configuration, determining a second uplink timing gap for communications with the second base station, determining, based on being in the dual connectivity configuration, a first uplink timing gap for communications with the first base station, where the first uplink timing gap is determined to be greater than the second uplink timing gap, and communicating with the first base station based on the first uplink timing gap.

A non-transitory computer-readable medium storing code for wireless communications is described. The code may include instructions executable by a processor to establish communications with a first base station and a second base station in accordance with a dual connectivity configuration, determine a second uplink timing gap for communications with the second base station, determine, based on being in the dual connectivity configuration, a first uplink timing gap for communications with the first base station, where the first uplink timing gap is determined to be greater than the second uplink timing gap, and communicate with the first base station based on the first uplink timing gap.

Some examples of the method, apparatuses, and non-transitory computer-readable medium described herein may further include operations, features, means, or instructions for receiving, from the first base station, an indication of a default uplink timing gap for communications with the first base station, receiving, from the first base station, an indication of an additional uplink timing gap for communications with the first base station when in the dual connectivity configuration, and determining the first uplink timing gap based on a combination of the default uplink timing gap and the additional uplink timing gap.

Some examples of the method, apparatuses, and non-transitory computer-readable medium described herein may further include operations, features, means, or instructions for receiving an indication of a set of uplink timing gaps for communications with the first base station, and identifying the default uplink timing gap from the set of uplink timing gaps based on the indication of the default uplink timing gap, where the indication includes an index for the set of uplink timing gaps.

Some examples of the method, apparatuses, and non-transitory computer-readable medium described herein may further include operations, features, means, or instructions for identifying a subcarrier spacing (SCS) for communications with the first base station, and determining the additional uplink timing gap for communications with the first base station based on the SCS.

In some examples of the method, apparatuses, and non-transitory computer-readable medium described herein, the additional uplink timing gap may be specific to a UE performing the method.

Some examples of the method, apparatuses, and non-transitory computer-readable medium described herein may further include operations, features, means, or instructions for receiving, from the first base station, an indication of a set of uplink timing gaps that may be based on the dual connectivity configuration, where a smallest entry in the set of uplink timing gaps may be configured to be greater than the second uplink timing gap, and receiving, from the first base station, an indication of the first uplink timing gap, where the indication includes an index for the set of uplink timing gaps.

Some examples of the method, apparatuses, and non-transitory computer-readable medium described herein may further include operations, features, means, or instructions for receiving an indication of a minimum uplink timing gap for communications with the first base station when in the dual connective configuration, receiving, from the first base station, an indication of an uplink timing gap that may be smaller than the minimum uplink timing gap, and determining the first uplink timing gap as equal to the minimum uplink timing gap.

Some examples of the method, apparatuses, and non-transitory computer-readable medium described herein may further include operations, features, means, or instructions for reporting a UE capability to the first base station, where the minimum uplink timing gap may be based on the UE capability.

Some examples of the method, apparatuses, and non-transitory computer-readable medium described herein may further include operations, features, means, or instructions for receiving, from the first base station, an indication of the first uplink timing gap based on DCI, a Radio Resource Control (RRC) message, or any combination thereof.

In some examples of the method, apparatuses, and non-transitory computer-readable medium described herein, communicating with the first base station may include operations, features, means, or instructions for receiving a downlink shared channel message from the first base station in a first slot, and transmitting a feedback message for the downlink shared channel message to the first base station in a second slot, where the first slot and the second slot may be separated by the first uplink timing gap.

Some examples of the method, apparatuses, and non-transitory computer-readable medium described herein may further include operations, features, means, or instructions for determining a third uplink timing gap for a second type of communications with the second base station, where the first uplink timing gap may be determined to be larger than the third uplink timing gap.

Some examples of the method, apparatuses, and non-transitory computer-readable medium described herein may further include operations, features, means, or instructions for determining, based on being in the dual connectivity configuration, a fourth uplink timing gap for the second type of communications with the first base station, where the fourth uplink timing gap may be determined to be larger than the first uplink timing gap and the third uplink timing gap.

In some examples of the method, apparatuses, and non-transitory computer-readable medium described herein, the first type of communications includes uplink control channel transmissions, and the second type of communications includes uplink shared channel transmissions.

Some examples of the method, apparatuses, and non-transitory computer-readable medium described herein may further include operations, features, means, or instructions for receiving, from the first base station, an indication of a default uplink timing gap for the second type of communications with the first base station, receiving, from the first base station, an indication of an additional uplink timing gap for the second type of communications with the first base station when in the dual connectivity configuration, and determining the fourth uplink timing gap based on a combination of the default uplink timing gap for the second type of communications and the additional uplink timing gap for the second type of communications.

Some examples of the method, apparatuses, and non-transitory computer-readable medium described herein may further include operations, features, means, or instructions for identifying a subcarrier spacing (SCS) for communications with the first base station, and determining the additional uplink timing gap for the second type of communications based on the SCS.

In some examples of the method, apparatuses, and non-transitory computer-readable medium described herein, the additional uplink timing gap for the second type of communications may be specific to a UE performing the method.

In some examples of the method, apparatuses, and non-transitory computer-readable medium described herein, the indication of the default uplink timing gap for the second type of communications may be received based on a PUSCH configuration.

In some examples of the method, apparatuses, and non-transitory computer-readable medium described herein, the PUSCH configuration includes a time domain allocation list for the second type of communications, and where the default uplink timing gap may be identified from the time domain allocation list.

Some examples of the method, apparatuses, and non-transitory computer-readable medium described herein may further include operations, features, means, or instructions for receiving, from the first base station, an indication of a second set of uplink timing gaps that may be based on the dual connectivity configuration, where a smallest entry in the second set of uplink timing gaps may be configured to be greater than the third uplink timing gap, and receiving, from the first base station, an indication of the fourth uplink timing gap, where the indication includes an index for the second set of uplink timing gaps.

Some examples of the method, apparatuses, and non-transitory computer-readable medium described herein may further include operations, features, means, or instructions for receiving an indication of a minimum uplink timing gap for the second type of communications with the first base station when in the dual connective configuration, receiving, from the first base station, an indication of an uplink timing gap for the second type of communications that may be smaller than the minimum uplink timing gap for the second type of communications when in the dual connective configuration, and determining the fourth uplink timing gap as equal to the minimum uplink timing gap for the second type of communications.

Some examples of the method, apparatuses, and non-transitory computer-readable medium described herein may further include operations, features, means, or instructions for reporting a UE capability to the first base station, where the minimum uplink timing gap for the second type of communications may be based on the UE capability.

Some examples of the method, apparatuses, and non-transitory computer-readable medium described herein may further include operations, features, means, or instructions for receiving a downlink control channel message from the first base station in a first slot, where the downlink control channel message schedules an uplink shared channel message for the UE, and transmitting the uplink shared channel message to the first base station in a second slot, where the first slot and the second slot may be separated by the fourth uplink timing gap.

Some examples of the method, apparatuses, and non-transitory computer-readable medium described herein may further include operations, features, means, or instructions for receiving, from the first base station, an indication of the fourth uplink timing gap based on DCI, a Radio Resource Control (RRC) message, or any combination thereof.

A method of wireless communications is described. The method may include establishing, at a first base station, communications with a UE that is in a dual connectivity configuration with the first base station and a second base station, identifying, based on the UE being in the dual connectivity configuration, a second uplink timing gap for communications between the UE and the second base station, indicating, to the UE, a first uplink timing gap for communications between the UE and the first base station, where the first uplink timing gap is indicated to be greater than the second uplink timing gap, and communicating with the UE based on the first uplink timing gap.

An apparatus for wireless communications is described. The apparatus may include a processor, memory in electronic communication with the processor, and instructions stored in the memory. The instructions may be executable by the processor to cause the apparatus to establish, at a first base station, communications with a UE that is in a dual connectivity configuration with the first base station and a second base station, identify, based on the UE being in the dual connectivity configuration, a second uplink timing gap for communications between the UE and the second base station, indicate, to the UE, a first uplink timing gap for communications between the UE and the first base station, where the first uplink timing gap is indicated to be greater than the second uplink timing gap, and communicate with the UE based on the first uplink timing gap.

Another apparatus for wireless communications is described. The apparatus may include means for establishing, at a first base station, communications with a UE that is in a dual connectivity configuration with the first base station and a second base station, identifying, based on the UE being in the dual connectivity configuration, a second uplink timing gap for communications between the UE and the second base station, indicating, to the UE, a first uplink timing gap for communications between the UE and the first base station, where the first uplink timing gap is indicated to be greater than the second uplink timing gap, and communicating with the UE based on the first uplink timing gap.

A non-transitory computer-readable medium storing code for wireless communications is described. The code may include instructions executable by a processor to establish, at a first base station, communications with a UE that is in a dual connectivity configuration with the first base station and a second base station, identify, based on the UE being in the dual connectivity configuration, a second uplink timing gap for communications between the UE and the second base station, indicate, to the UE, a first uplink timing gap for communications between the UE and the first base station, where the first uplink timing gap is indicated to be greater than the second uplink timing gap, and communicate with the UE based on the first uplink timing gap.

Some examples of the method, apparatuses, and non-transitory computer-readable medium described herein may further include operations, features, means, or instructions for transmitting, to the UE, an indication of a default uplink timing gap for communications between the UE and the first base station, transmitting, to the UE, an indication of an additional uplink timing gap for communications between the UE and the first base station when in the dual connectivity configuration, and determining the first uplink timing gap based on a combination of the default uplink timing gap and the additional uplink timing gap.

Some examples of the method, apparatuses, and non-transitory computer-readable medium described herein may further include operations, features, means, or instructions for transmitting, to the UE, an indication of a set of uplink timing gaps for communications between the UE and the first base station, where the indication of the default uplink timing gap includes an index for the set of uplink timing gaps.

Some examples of the method, apparatuses, and non-transitory computer-readable medium described herein may further include operations, features, means, or instructions for identifying a subcarrier spacing (SCS) for communications between the UE and the first base station, and determining the additional uplink timing gap based on the SCS.

In some examples of the method, apparatuses, and non-transitory computer-readable medium described herein, the additional uplink timing gap may be specific to the UE.

Some examples of the method, apparatuses, and non-transitory computer-readable medium described herein may further include operations, features, means, or instructions for determining a set of uplink timing gaps based on the dual connectivity configuration, where the set of uplink timing gaps may be configured to may have a smallest entry that may be greater than the second uplink timing gap, transmitting, to the UE, an indication of the set of uplink timing gaps, and transmitting, to the UE, an indication of the first uplink timing gap, where the indication includes an index for the set of uplink timing gaps.

Some examples of the method, apparatuses, and non-transitory computer-readable medium described herein may further include operations, features, means, or instructions for transmitting an indication of a minimum uplink timing gap for communications between the UE and the first base station when in the dual connectivity configuration, where the minimum uplink timing gap may be configured to be greater than the second uplink timing gap.

Some examples of the method, apparatuses, and non-transitory computer-readable medium described herein may further include operations, features, means, or instructions for receiving an indication of a UE capability from the UE, and determining the minimum uplink timing gap based on the UE capability.

Some examples of the method, apparatuses, and non-transitory computer-readable medium described herein may further include operations, features, means, or instructions for transmitting, to the UE, an indication of the first uplink timing gap based on DCI, a Radio Resource Control (RRC) message, or any combination thereof.

In some examples of the method, apparatuses, and non-transitory computer-readable medium described herein, communicating with the UE may include operations, features, means, or instructions for transmitting a downlink shared channel message to the UE in a first slot, and receiving a feedback message for the downlink shared channel message from the UE in a second slot, where the first slot and the second slot may be separated by the first uplink timing gap.

In some examples of the method, apparatuses, and non-transitory computer-readable medium described herein, identifying the second uplink timing gap further may include operations, features, means, or instructions for communicating with the second base station over a backhaul link, and receiving an indication of the second uplink timing gap based on the communicating with the second base station.

Some examples of the method, apparatuses, and non-transitory computer-readable medium described herein may further include operations, features, means, or instructions for negotiating the first uplink timing gap with the second base station based on the second uplink timing gap.

Some examples of the method, apparatuses, and non-transitory computer-readable medium described herein may further include operations, features, means, or instructions for identifying a third uplink timing gap for a second type of communications between the UE and the second base station, and determining the first uplink timing gap to be greater than the third uplink timing gap.

Some examples of the method, apparatuses, and non-transitory computer-readable medium described herein may further include operations, features, means, or instructions for determining, based on the UE being in the dual connectivity configuration, a fourth uplink timing gap for the second type of communications between the UE and the first base station, where the fourth uplink timing gap may be determined to be greater than the second uplink timing gap and the third uplink timing gap, and indicating, to the UE, the fourth uplink timing gap for the second type of communications between the UE and the first base station.

In some examples of the method, apparatuses, and non-transitory computer-readable medium described herein, the first type of communications includes uplink control channel transmissions, and the second type of communications includes uplink shared channel transmissions.

Some examples of the method, apparatuses, and non-transitory computer-readable medium described herein may further include operations, features, means, or instructions for transmitting, to the UE, an indication of a default uplink timing gap for the second type of communications between the UE and the first base station, transmitting, to the UE, an indication of an additional uplink timing gap for the second type of communications between the UE and the first base station when in the dual connectivity configuration, and determining the fourth uplink timing gap based on a combination of the default uplink timing gap for the second type of communications and the additional uplink timing gap for the second type of communications.

Some examples of the method, apparatuses, and non-transitory computer-readable medium described herein may further include operations, features, means, or instructions for identifying a subcarrier spacing (SCS) for communications with the UE, and determining the additional uplink timing gap for the second type of communications based on the SCS.

In some examples of the method, apparatuses, and non-transitory computer-readable medium described herein, the additional uplink timing gap may be specific to the UE.

In some examples of the method, apparatuses, and non-transitory computer-readable medium described herein, the indication of the default uplink timing gap may be transmitted based on a PUSCH configuration.

In some examples of the method, apparatuses, and non-transitory computer-readable medium described herein, the PUSCH configuration includes a time domain allocation list for the second type of communications, and where the time domain allocation list includes the default uplink timing gap.

Some examples of the method, apparatuses, and non-transitory computer-readable medium described herein may further include operations, features, means, or instructions for determining a second set of uplink timing gaps based on the dual connectivity configuration, where the second set of uplink timing gaps may be configured to may have a smallest entry that may be greater than the third uplink timing gap, transmitting, to the UE, an indication of the second set of uplink timing gaps, and transmitting, to the UE, an indication of the fourth uplink timing gap, where the indication includes an index for the second set of uplink timing gaps.

Some examples of the method, apparatuses, and non-transitory computer-readable medium described herein may further include operations, features, means, or instructions for transmitting an indication of a minimum uplink timing gap for the second type of communications between the UE and the first base station, where the minimum uplink timing gap for the second type of communications may be configured to be greater than the third uplink timing gap.

Some examples of the method, apparatuses, and non-transitory computer-readable medium described herein may further include operations, features, means, or instructions for receiving an indication of a UE capability from the UE, and determining the minimum uplink timing gap for the second type of communications based on the UE capability.

Some examples of the method, apparatuses, and non-transitory computer-readable medium described herein may further include operations, features, means, or instructions for transmitting a downlink control channel message to the UE in a first slot, where the downlink control channel message schedules an uplink shared channel message for the UE, and receiving the uplink shared channel message from the UE in a second slot, where the first slot and the second slot may be separated by the fourth uplink timing gap.

Some examples of the method, apparatuses, and non-transitory computer-readable medium described herein may further include operations, features, means, or instructions for transmitting, to the UE, an indication of the fourth uplink timing gap based on DCI, a Radio Resource Control (RRC) message, or any combination thereof.

In some examples of the method, apparatuses, and non-transitory computer-readable medium described herein, identifying the third uplink timing gap further may include operations, features, means, or instructions for communicating with the second base station over a backhaul link, and receiving an indication of the third uplink timing gap based on the communicating with the second base station.

Some examples of the method, apparatuses, and non-transitory computer-readable medium described herein may further include operations, features, means, or instructions for negotiating the fourth uplink timing gap with the second base station based on the third uplink timing gap.

A method of wireless communications at a UE is described. The method may include establishing communications with a first base station and a second base station in accordance with a dual connectivity configuration, determining a first uplink timing gap for communications with the first base station, where the first uplink timing gap is based on the UE being in the dual connectivity configuration and is larger than a second uplink timing gap for communications with the second base station, assigning a first priority to transmit power determinations for uplink communications with the first base station, where the first priority is higher than a second priority associated with transmit power determinations for uplink communications with the second base station, and communicating with the first base station based on the first uplink timing gap and the first priority and with the second base station based on the second uplink timing gap and the second priority.

An apparatus for wireless communications at a UE is described. The apparatus may include a processor, memory in electronic communication with the processor, and instructions stored in the memory. The instructions may be executable by the processor to cause the apparatus to establish communications with a first base station and a second base station in accordance with a dual connectivity configuration, determine a first uplink timing gap for communications with the first base station, where the first uplink timing gap is based on the UE being in the dual connectivity configuration and is larger than a second uplink timing gap for communications with the second base station, assign a first priority to transmit power determinations for uplink communications with the first base station, where the first priority is higher than a second priority associated with transmit power determinations for uplink communications with the second base station, and communicate with the first base station based on the first uplink timing gap and the first priority and with the second base station based on the second uplink timing gap and the second priority.

Another apparatus for wireless communications at a UE is described. The apparatus may include means for establishing communications with a first base station and a second base station in accordance with a dual connectivity configuration, determining a first uplink timing gap for communications with the first base station, where the first uplink timing gap is based on the UE being in the dual connectivity configuration and is larger than a second uplink timing gap for communications with the second base station, assigning a first priority to transmit power determinations for uplink communications with the first base station, where the first priority is higher than a second priority associated with transmit power determinations for uplink communications with the second base station, and communicating with the first base station based on the first uplink timing gap and the first priority and with the second base station based on the second uplink timing gap and the second priority.

A non-transitory computer-readable medium storing code for wireless communications at a UE is described. The code may include instructions executable by a processor to establish communications with a first base station and a second base station in accordance with a dual connectivity configuration, determine a first uplink timing gap for communications with the first base station, where the first uplink timing gap is based on the UE being in the dual connectivity configuration and is larger than a second uplink timing gap for communications with the second base station, assign a first priority to transmit power determinations for uplink communications with the first base station, where the first priority is higher than a second priority associated with transmit power determinations for uplink communications with the second base station, and communicate with the first base station based on the first uplink timing gap and the first priority and with the second base station based on the second uplink timing gap and the second priority.

Some examples of the method, apparatuses, and non-transitory computer-readable medium described herein may further include operations, features, means, or instructions for receiving, from the first base station, an indication of the fourth uplink timing gap via a Radio Resource Control (RRC) message.

In some examples of the method, apparatuses, and non-transitory computer-readable medium described herein, the first uplink timing gap may be larger than a timing gap for communications with the first base station when the UE may be not in the dual connectivity configuration.

In some examples of the method, apparatuses, and non-transitory computer-readable medium described herein, the first uplink timing gap includes a gap between receiving a downlink transmission from the first base station and transmitting a corresponding uplink transmission to the first base station, and the second uplink timing gap includes a gap between receiving a downlink transmission from the second base station and transmitting a corresponding uplink transmission to the second base station.

In some examples of the method, apparatuses, and non-transitory computer-readable medium described herein, the first uplink timing gap includes a gap between receiving a downlink transmission from the first base station and transmitting a corresponding uplink transmission to the first base station, and the second uplink timing gap includes a gap between determining a transmit power for an uplink transmission to the second base station and transmitting the uplink transmission to the second base station.

Some examples of the method, apparatuses, and non-transitory computer-readable medium described herein may further include operations, features, means, or instructions for communicating with the second base station via a set of component carriers associated with a corresponding set of uplink timing gaps, where the second uplink timing gap may be a largest one of the corresponding set of uplink timing gaps.

In some examples of the method, apparatuses, and non-transitory computer-readable medium described herein, the corresponding set of uplink timing gaps may be for uplink control channel transmissions, the set of component carriers may be associated with a second corresponding set of uplink timing gaps for uplink shared channel transmissions, and the second uplink timing gap may be a largest one of the corresponding set of uplink timing gaps and the second corresponding set of uplink timing gaps.

In some examples of the method, apparatuses, and non-transitory computer-readable medium described herein, a third uplink timing gap includes a gap between determining a transmit power for an uplink transmission to the first base station and transmitting the uplink transmission to the second base station, and where the first uplink timing gap may be based on a combination of the second uplink timing gap and the third uplink timing gap.

In some examples of the method, apparatuses, and non-transitory computer-readable medium described herein, the first uplink timing gap includes a gap between determining a transmit power for an uplink transmission to the first base station and transmitting the uplink transmission to the first base station, and the second uplink timing gap includes a gap between determining a transmit power for an uplink transmission to the second base station and transmitting the uplink transmission to the second base station.

Some examples of the method, apparatuses, and non-transitory computer-readable medium described herein may further include operations, features, means, or instructions for determining that the uplink transmission to the first base station and the uplink transmission to the second base station at least partially overlap in time.

In some examples of the method, apparatuses, and non-transitory computer-readable medium described herein, communicating with the first base station based on the first priority and with the second base station based on the second priority may include operations, features, means, or instructions for determining a first transmit power for an uplink transmission to the first base station, and determining a second transmit power for an uplink transmission to the second base station based on a difference between a transmit power limit and the first transmit power.

A method of wireless communications at a first base station is described. The method may include establishing communications with a UE that is in a dual connectivity configuration with the first base station and a second base station, identifying a second uplink timing gap for communications between the UE and the second base station, determining, based on the UE being in the dual connectivity configuration, a first uplink timing gap for communications between the UE and the first base station that is larger than the second uplink timing gap, and communicating with the UE based on the first uplink timing gap.

An apparatus for wireless communications at a first base station is described. The apparatus may include a processor, memory in electronic communication with the processor, and instructions stored in the memory. The instructions may be executable by the processor to cause the apparatus to establish communications with a UE that is in a dual connectivity configuration with the first base station and a second base station, identify a second uplink timing gap for communications between the UE and the second base station, determine, based on the UE being in the dual connectivity configuration, a first uplink timing gap for communications between the UE and the first base station that is larger than the second uplink timing gap, and communicate with the UE based on the first uplink timing gap.

Another apparatus for wireless communications at a first base station is described. The apparatus may include means for establishing communications with a UE that is in a dual connectivity configuration with the first base station and a second base station, identifying a second uplink timing gap for communications between the UE and the second base station, determining, based on the UE being in the dual connectivity configuration, a first uplink timing gap for communications between the UE and the first base station that is larger than the second uplink timing gap, and communicating with the UE based on the first uplink timing gap.

A non-transitory computer-readable medium storing code for wireless communications at a first base station is described. The code may include instructions executable by a processor to establish communications with a UE that is in a dual connectivity configuration with the first base station and a second base station, identify a second uplink timing gap for communications between the UE and the second base station, determine, based on the UE being in the dual connectivity configuration, a first uplink timing gap for communications between the UE and the first base station that is larger than the second uplink timing gap, and communicate with the UE based on the first uplink timing gap.

In some examples of the method, apparatuses, and non-transitory computer-readable medium described herein, the first uplink timing gap may be larger than an uplink timing gap for communications between the first base station and the UE when the UE may be not in the dual connectivity configuration.

In some examples of the method, apparatuses, and non-transitory computer-readable medium described herein, the first uplink timing gap includes a gap between transmitting a downlink transmission to the UE and receiving a corresponding uplink transmission from the UE, and the second uplink timing gap includes a gap between downlink transmissions and corresponding uplink transmissions from the UE to the second base station.

In some examples of the method, apparatuses, and non-transitory computer-readable medium described herein, the first uplink timing gap includes a gap between transmitting a downlink transmission to the UE and receiving a corresponding uplink transmission from the UE, and the second uplink timing gap includes a gap between transmit power determinations and corresponding uplink transmissions from the UE to the second base station.

In some examples of the method, apparatuses, and non-transitory computer-readable medium described herein, the dual connectivity configuration includes a set of component carriers for the second base station associated with a corresponding set of uplink timing gaps, and where the second uplink timing gap may be a largest one of the corresponding set of uplink timing gaps.

In some examples of the method, apparatuses, and non-transitory computer-readable medium described herein, the corresponding set of uplink timing gaps may be for uplink control channel transmissions, the set of component carriers may be associated with a second corresponding set of uplink timing gaps for uplink shared channel transmissions, and the second uplink timing gap may be a largest one of the corresponding set of uplink timing gaps and the second corresponding set of uplink timing gaps.

In some examples of the method, apparatuses, and non-transitory computer-readable medium described herein, a third uplink timing gap includes a gap between transmit power determinations and corresponding uplink transmissions from the UE to the second base station, and where the first uplink timing gap may be based on a combination of the second uplink timing gap and the third uplink timing gap.

In some examples of the method, apparatuses, and non-transitory computer-readable medium described herein, the first uplink timing gap includes a gap between determining a transmit power for an uplink transmission to the first base station and transmitting the uplink transmission to the first base station, and the second uplink timing gap includes a gap between determining a transmit power for an uplink transmission to the second base station and transmitting the uplink transmission to the second base station.

Some examples of the method, apparatuses, and non-transitory computer-readable medium described herein may further include operations, features, means, or instructions for transmitting, to the UE, an indication of a first priority for transmit power determinations for uplink communications with the first base station, where the first priority may be higher than a second priority associated with transmit power determinations for uplink communications with the second base station.

DETAILED DESCRIPTION

Figure 1:
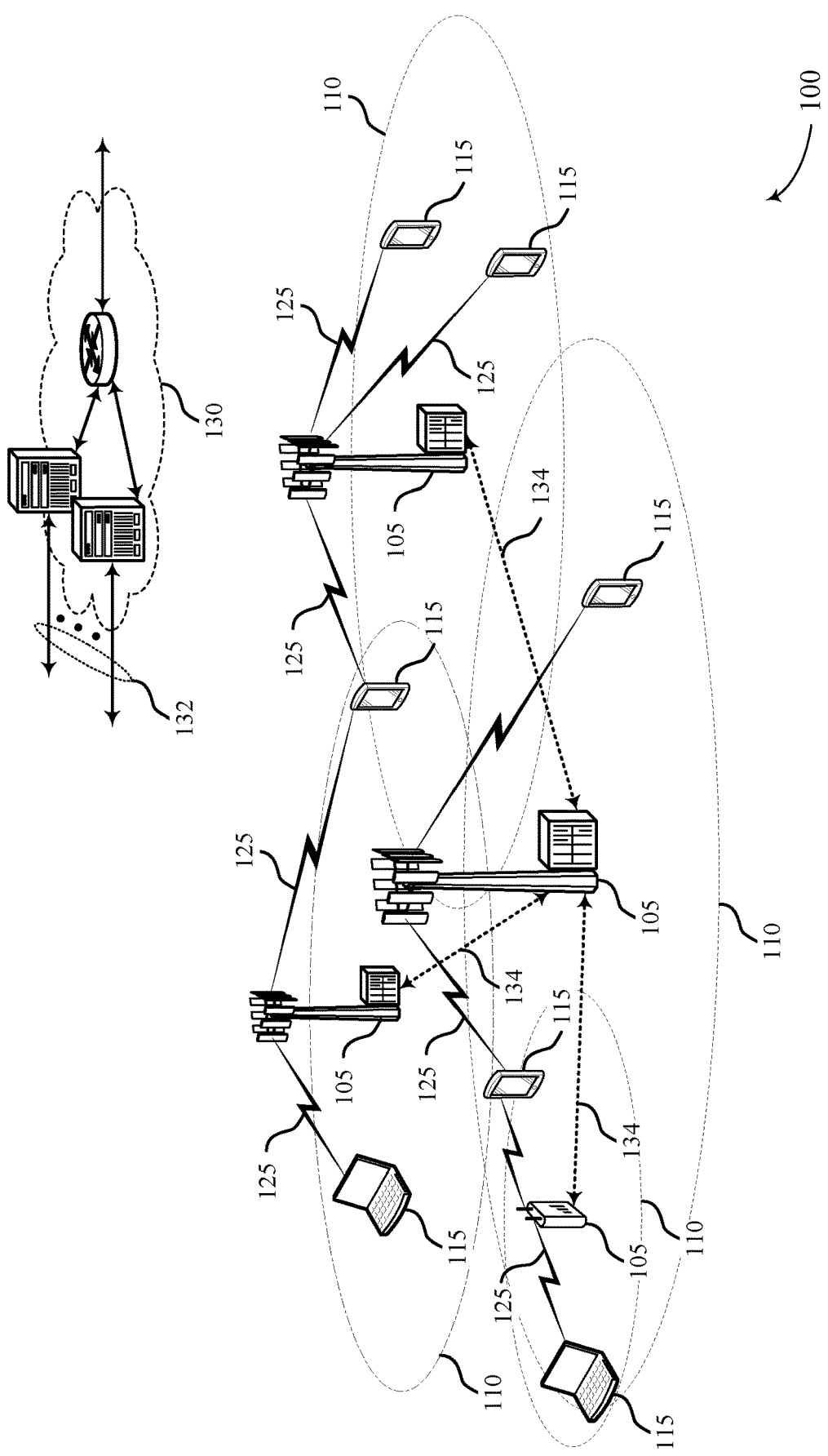
FIG. 1 illustrates an example of a system for wireless communications that supports uplink power control for dual connectivity in accordance with aspects of the present disclosure.

A user equipment (UE) may be configured to communicate with two base stations according to a dual connectivity communications configuration. In the dual connectivity communications configuration, a first base station may provide a master cell group (MCG), and a second base station may provide a secondary cell group (SCG). In some cases, the UE may communicate with both of the base stations according to New Radio (NR) communications (e.g., NR- NR dual connectivity). The MCG may, in some cases, be generally used for coverage and mobility. The UE may support simultaneous transmission on both the MCG and the SCG. For example, while the UE transmits an uplink message on the MCG, the UE may be scheduled to begin transmitting an uplink message on the SCG.

The UE may have an uplink transmit power limit for uplink transmissions across both cell groups of the dual connectivity configuration. When the UE transmits on the MCG and the SCG simultaneously, the UE may not be allowed to exceed the uplink transmit power limit for the total transmit power on the MCG and the SCG combined. In some dual connectivity schemes, different cell groups may not be aware of each other or scheduling decisions (including uplink transmit powers) related to communications between the UE and other cell groups. Therefore, in some cases, it may not be guaranteed that UE can follow a command for a first cell group as there may be another overlapping, or concurrent, transmission on the other cell group, as the command may make the UE exceed the total uplink transmit power budget. Additionally or alternatively, in some cases, to compensate for the transmit power of the second (e.g., not the ongoing) transmission, the UE may reduce transmit power of the first transmission. This may result in a phase shift and phase discontinuity, and the base station intended to receive the first transmission may not be able to decode it.

Therefore, UEs and base stations described herein may implement techniques for enhanced transmit power control in a dual connectivity configuration. For example, the MCG (e.g., communications with the MCG) may be slowed down and given increased priority over the SCG (e.g., communications with the SCG). Slowing down the MCG may refer to increasing a timing gap between when a downlink message is transmitted to a UE and when a corresponding uplink message is transmitted by the UE in response.

Some examples of timing gaps may be referred to as K timing gaps. A K timing gap may refer to, for example, a gap (delay, time, number of slots or other scheduling unit) between a UE receiving a downlink transmission (e.g., a downlink shared channel transmission or a downlink control channel transmission) and transmitting a corresponding uplink transmission (e.g., an acknowledgement, feedback, or other message prompted by the downlink shared channel transmission, or an uplink transmission scheduled by the downlink control channel transmission). For example, one example of a timing gap may be referred to as a K1 timing gap. The K1 timing gap may refer to the time (e.g., number of slots or other temporal or scheduling unit) between a base station transmitting a downlink data transmission to a UE and the UE transmitting a feedback message (e.g., HARQ feedback) in response. A second example of a timing gap may be referred to as a K2 timing gap. The K2 timing gap may refer to the time (e.g., number of slots or other temporal or scheduling unit) between a base station transmitting downlink control information to a UE and the UE transmitting an uplink shared channel message (e.g., an uplink data message) in response. To slow down the MCG, the UE and the base stations in the dual connectivity configuration may implement techniques to increase the size of a timing gap for MCG communications (e.g., K1, K2, or both), thereby increasing the time between a downlink message and corresponding uplink message exchanged between the UE and the MCG.

Other examples of timing gaps may be referred to as N timing gaps. An N timing gap may refer to, for example, a gap (delay, time, number of slots or other scheduling unit) between a UE determining a transmit power for an uplink transmission and transmitting the uplink transmission. For example, an N1 timing gap may refer to the time (e.g., number of slots or other temporal or scheduling unit) between a UE determining a transmit power for an uplink control channel transmission and the UE transmitting the uplink control channel transmission (e.g., a UE may wait until N1 symbols prior to transmitting the uplink control channel transmission to determine the transmit power thereof). As another example, an N2 timing gap may refer to the time (e.g., number of slots or other temporal or scheduling unit) between a UE determining a transmit power for an uplink control channel transmission and the UE transmitting the uplink data channel transmission (e.g., a UE may wait until N2 symbols prior to transmitting the uplink data channel transmission to determine the transmit power thereof). In general, techniques described herein in the context of a K timing gap may be applied in the context of an N timing gap, and vice versa, including setting one or more K timing gaps based on one or more N timing gaps and vice versa.

If the MCG is slowed down, the MCG can achieve (specify) a required or desired uplink transmit power for communications from the UE to the MCG. The SCG can thus adapt the uplink transmission powers for communications from the UE to the SCG accordingly. An uplink transmit power for MCG uplink transmissions may be set ahead of time so that the UE may use an SCG uplink transmit power based on the earlier-set MCG uplink transmit power. Various techniques for increasing the size of an MCG timing gap (e.g., the MCG K1, MCG K2, MCG N1, or MCG N2) are described herein. Generally, an MCG timing gap may each be configured to be greater than some or all SCG timing gaps (e.g., than one or more of the SCG K1 and SCG K2, than one or more of the SCG N1 and SCG N2, or any combination thereof). By implementing these techniques for uplink power control, the UE may use uplink transmit powers which still abide by the uplink transmit power budget even during concurrent transmission on the MCG and the SCG. This may, for example, prevent introducing phase discontinuity to transmissions on the MCG or the SCG.

Aspects of the disclosure are initially described in the context of a wireless communications system. Aspects of the disclosure are further illustrated by and described with reference to apparatus diagrams, system diagrams, and flowcharts that relate to uplink power control for dual connectivity.

FIG. 1 illustrates an example of a wireless communications system 100 that supports uplink power control for dual connectivity in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 and base stations 105 configured for a dual connectivity configuration described herein may implement techniques for enhanced transmit power control. For example, communications with an MCG may be slowed down and given increased priority relative to communications with an SCG. Slowing down the MCG (or communications therewith) may refer to increasing a timing gap (e.g., a delay or separation) between when a downlink message is transmitted to a UE 115 and when a corresponding uplink message is transmitted by the UE 115 in response. One example of a timing gap may be referred to as a K1 timing gap, which may be the time (e.g., number of slots or other temporal or scheduling unit) between a base station 105 transmitting a downlink data transmission to a UE 115 and the UE 115 transmitting a feedback message in response. A second example of a timing gap may be referred to as a K2 timing gap, which may be the time (e.g., number of slots or other temporal or scheduling unit) between a base station 105 transmitting downlink control information to a UE 115 and the UE 115 transmitting an uplink shared channel message in response.

If communications with the MCG are slowed down, the MCG can achieve its required or desired power, and the uplink transmission powers of the SCG can then be adapted accordingly. An uplink transmit power for MCG uplink transmissions may be set ahead of time so that the UE 115 may use an SCG uplink transmit power based on the earlier-set MCG uplink transmit power. To slow down the MCG, the UE 115 and the base stations 105 in the dual connectivity configuration may implement techniques to increase the size of a timing gap, such as K1, K2, or both, thereby increasing the time between a downlink message and corresponding uplink message. Generally, an MCG timing gap (e.g., the MCG K1 and MCG K2) may be configured to be greater than some or all SCG timing gaps (e.g., the SCG K1 and SCG K2).

Figure 2:
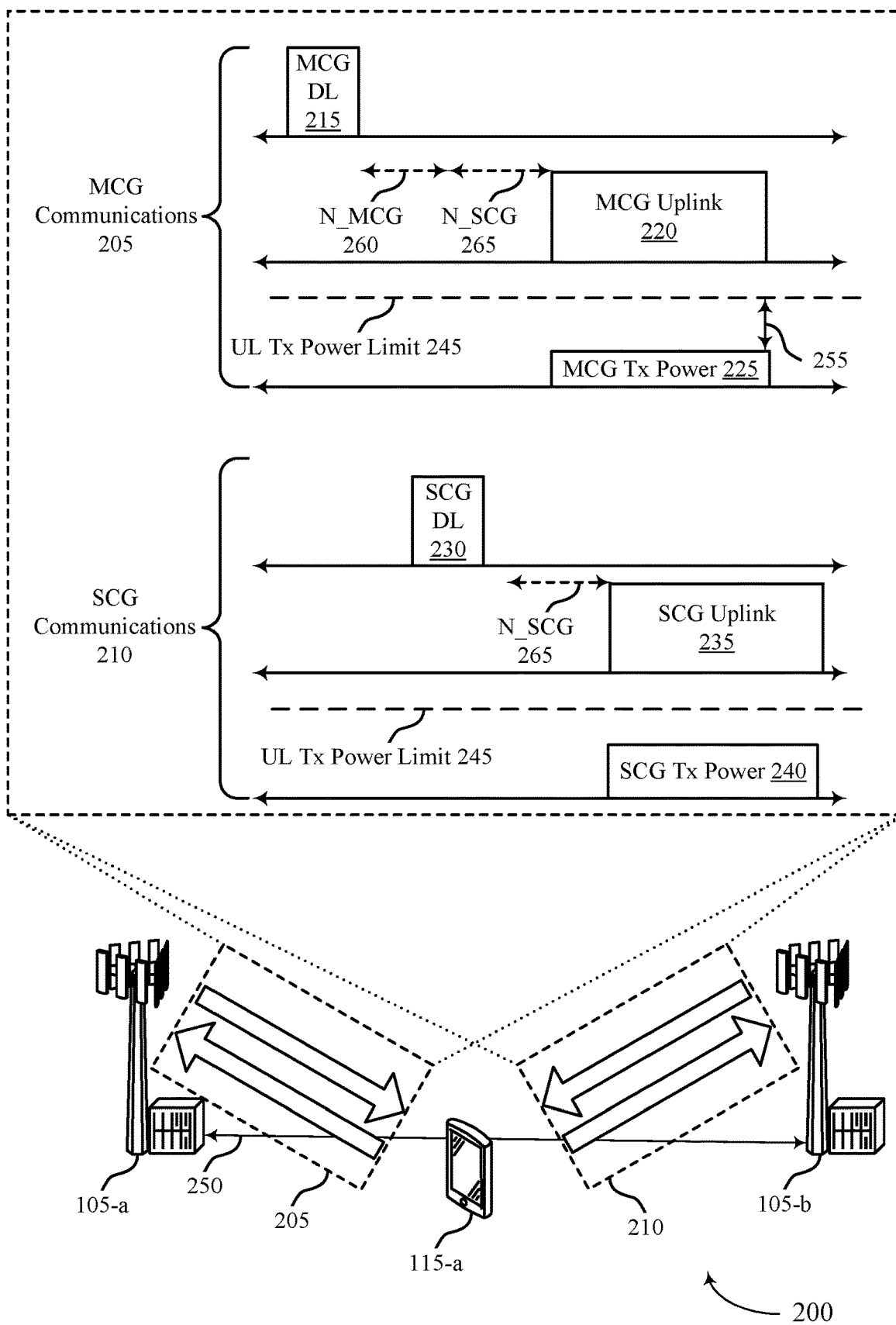
FIG. 2 illustrates an example of a wireless communications system that supports uplink power control for dual connectivity in accordance with aspects of the present disclosure.

FIG. 2 illustrates an example of a wireless communications system 200 that supports uplink power control for dual connectivity in accordance with aspects of the present disclosure. In some examples, wireless communications system 200 may implement aspects of wireless communication system 100.

Wireless communications system 200 may include UE 115-a, which may be an example of a UE 115 as described herein. Wireless communications system may also include base station 105-a and base station 105-b, which may each be an example of a base station 105 as described herein. In some example, UE 115-a may be configured to communicate with both base station 105-a and base station 105-b according to a dual connectivity communications configuration. In this example, base station 105-a may provide a master cell group (MCG), and base station 105-b may provide a secondary cell group (SCG). UE 115-a may perform MCG communications 205 with the MCG and SCG communications 210 with the SCG. UE 115-a may support uplink communications, downlink communications, or both on the SCG and the MCG. In some cases, UE 115-a may communicate with both of the base stations 105 according to NR communications (e.g., NR-NR dual connectivity).

The wireless communications system 200 may support one or more frequency ranges (e.g., sub-6 Ghz and mmW, among others). In some cases, the dual connectivity configuration used by UE 115-a may support communications in a first frequency range (e.g., FR1) on both cell groups (e.g., the MCG and the SCG). In a non-limiting example, the first frequency range may include a frequency range from, for example, 450 MHz to 6 GHz. In some cases, other ranges for the first frequency range may be supported as well.

UE 115-a may support simultaneous transmission on both the MCG and the SCG. For example, while UE 115-a transmits an uplink message on the MCG, UE 115-a may be scheduled to begin transmitting an uplink message on the SCG. As shown, UE 115-a may simultaneously transmit an MCG uplink transmission 220 and an SCG uplink transmission 235, where the MCG uplink transmission 220 and the SCG uplink transmission 235 at last slightly overlap in time. Other examples of transmission timing (e.g., starting or end timing for uplink transmission on the MCG or SCG) are supported as well.

UE 115-a may have an uplink transmit power limit 245 for uplink transmissions across both cell groups of the dual connectivity configuration. The uplink transmit power limit 245 may, in some cases, be referred to as a transmit power budget, etc. When UE 115-a transmits on the MCG and the SCG simultaneously, UE 115-a may not be allowed to exceed the uplink transmit power limit 245 for the total transmit power on the MCG and the SCG combined. Therefore, UE 115-a and the base stations 105 of the cell groups may implement techniques for UE transmit power control to keep the total transmit power from UE 115-a on both cell groups below the transmit power budget.

Some conventional systems may support semi-static power control and dynamic power control for a UE 115 in a dual connectivity configuration. For semi-static power control, the power control decisions in one cell group may not be affected by dynamic scheduling of the other cell group. With semi-static power control, the total power (e.g., the transmit power budget) may be semi-statically split between the MCG and the SCG such that the total transmit power constraint is not violated or exceeded due to concurrent transmissions in the two cell groups.

In dynamic power control, the power control decisions in one cell group may be a function of the dynamic scheduling of the other cell group. Due to concurrent transmissions on the MCG and the SCG, for example, the UE 115 may be requested or configured to exceed the uplink transmit power limit 245. In dual connectivity, unlike carrier aggregation configurations, component carriers may not be aware of each other. For example, since there is not dynamic coordinate across the base stations 105 of the dual connectivity configuration, the base stations 105 may not be aware of each other's decisions, such as scheduling or transmit power commands.

Therefore, with conventional dynamic power control schemes, it may not be guaranteed that UE 115 can follow a command for a first cell group as there may be another overlapping, or concurrent, transmission on the other cell group, or at least may not be able to follow the command without violating a power limit or budget. The transmission powers indicated for the UE 115 to use for the first cell and the second cell group combined may, in some cases, exceed the total uplink transmit power budget of the UE 115. In some cases, to compensate for the transmit power of the second (e.g., not the ongoing) transmission, the UE 115 may reduce transmit power of the first transmission. This may result in a phase shift and phase discontinuity at the base station 105 receiving the first transmission. Thus, the corresponding base station 105 may not be able to decode the first transmission but may not know why the first transmission cannot be decoded.

Therefore, UE 115-a, base station 105-a, and base station 105-b, among other UEs 115 and base stations 105 described herein, may implement techniques for enhanced transmit power control in a dual connectivity configuration. For example, the MCG may be slowed down and given increased priority over the SCG. Slowing down the MCG may refer to increasing a timing gap between when a downlink message is transmitted to UE 115-*a* and when a corresponding uplink message is transmitted by UE 115-*a* in response.

One example of a timing gap is a K1 timing gap. The K1 timing gap may refer to the time between base station 105-*a* transmitting a downlink data transmission to UE 115-*a* and UE 115-*a* transmitting a feedback message (e.g., HARQ feedback) in response. A second example of a timing gap is a K2 timing gap. The K2 timing gap may refer to the time between base station 105-*a* transmitting downlink control information to UE 115-*a* and UE 115-*a* transmitting an uplink shared channel message (e.g., a physical uplink shared channel (PUSCH) transmission or an uplink data transmission) in response. To slow down the MCG, UE 115-*a* and the base stations 105 in the dual connectivity configuration may implement techniques to increase the size of K1, K2, or both, thereby increasing the time between a downlink message and corresponding uplink message.

If the MCG is slowed down, the MCG can achieve its required power. The uplink transmission powers of the SCG can then adapt accordingly. An uplink transmit power for the MCG uplink transmission 220 (e.g., an MCG transmit power 225) may be set ahead of time so that when UE 115-*a* receives a downlink SCG transmission 230 to schedule the SCG uplink transmission 235, UE 115-*a* may select an uplink transmit power for the SCG uplink transmission 235 (e.g., an SCG transmit power 240) based on the MCG transmit power 225 (and thus avoid having to adjust the MCG transmit power 225 during (e.g., in the middle of) an MCG uplink transmission 220). For example, UE 115-*a* may set the SCG transmit power 240 to a difference 255 between the MCG transmit power 225 and the uplink transmit power limit 245. Additionally or alternatively, in some cases, base station 105-*a* and base station 105-*b* may coordinate (e.g., over a backhaul link 250) to configure transmit power control settings for the MCG and the SCG (e.g., the SCG may adjust the uplink transmit power it configures for the UE 115-*a* based on knowledge of uplink transmit power for one or more transmissions from the UE 115-*a* to the MCG).

The techniques described herein may therefore prevent UE 115-*a* from adjusting transmit power for a transmission while the transmission is happening, which may introduce a phase shift and phase continuity. Instead, by implementing these techniques for uplink power control, UE 115-*a* may use uplink transmit powers which still abide by the uplink transmit power budget even during concurrent transmission on the MCG and the SCG. This may prevent introducing phase discontinuity to transmissions on the MCG or the SCG due to UE 115-*a* adjusting a transmit power while transmitting.

UE 115-*a* and the base stations 105 may implement techniques to increase the size of K1 and K2 for the MCG, which may effectively slow down the MCG. For example, a minimum value for K1 and K2 for the MCG may be increased, such that UE 115-*a* does not use a K1 or K2 value which is smaller than the minimum value. The K1 and K2 values of the MCG may each be configured to be larger than the K1 and K2 values of the SCG. Therefore, the MCG may identify the K1 and K2 values used by the SCG. Base station 105-*a* and base station 105-*b* may, in some cases, communicate over a backhaul link 250 to exchange information related to timing gaps and minimum values for timing gaps such as K1 and K2. Base station 105-*a* and base station 105-*b* may coordinate over the backhaul link 250 to configure the K1 and K2 of the MCG to be greater than the K1 and K2 values of the SCG. This coordination may, in some cases, occur semi-statically. In some cases, K1 of the MCG may be set based on comparing a configured value for the K1 MCG and a minimum value for K1 of the MCG (e.g., effective K1 of MCG=max (minimum K1, indicated value)).

UE 115-*a* may assign a higher priority for transmit power determinations for uplink communications with base station 105-*a* than for transmit power determinations for uplink communications with base station 105-*a*. For example, once the transmit power for an uplink communication with base station 105-*a* has been determined, a transmit power for an overlapping (at least partially concurrent) uplink communication with base station 105-*b* may be adapted (adjusted) to maintain (avoid altering) the prior-determined transmit power for the uplink communication with base station 105-*a*. In this way, uplink transmit power determinations for the MCG of the dual connectivity configuration may be prioritized over uplink transmit power determinations for the SCG of the dual connectivity configuration. In some cases, by modifying the timing gap values for K1 and K2 of the MCG, UE 115-*a* may have more time to select an uplink transmit power for the MCG earlier than an uplink transmit power for the SCG. Thus, UE 115-*a* may determine an uplink transmit power for the MCG prior to determining an uplink transmit power for the SCG. Once the MCG uplink transmit power 225 is determined, UE 115-*a* may determine an uplink SCG transmit power 240 based on a remaining amount of the uplink transmit power budget 245 and the MCG uplink transmit power 225.

In an example, UE 115-*a* may check for downlink control signaling that schedules an MCG uplink transmission at a configured time before an SCG uplink transmission. For example, UE 115-*a* may be scheduled resources for an SCG uplink transmission at time $T_0$. At a time $T_0-T_{offset}$, UE 115-*a* may check a downlink control channel for scheduling of an overlapping MCG uplink transmission. If UE 115-*a* detects an MCG uplink transmission scheduled by time $T_0-T_{offset}$, then UE 115-*a* may set the SCG uplink transmit power based on the MCG uplink transmit power. UE 115-*a* may not expect to be scheduled by a downlink control channel (e.g., on the MCG) for MCG uplink transmission that overlaps the SCG transmission after time $T_0-T_{offset}$. For example, UE 115-*a* may select the SCG uplink transmit power, power$_{SCG}$ such that Power$_{SCG}$=min{$P_{SCG}$, $P_{total}-P_{MCG}$}, where $P_{SCG}$ is the configured transmit power, and $P_{total}-P_{MCG}$ is the remaining power headroom after the transmit power for the MCG is considered. This may ensure that the total uplink transmit power stays below a configured uplink transmit power limit.

The timing offset, $T_{offset}$, may be configurable for pre-configured. In some cases, $T_{offset}$ may be based on a processing time of UE 115-*a*. In some cases, $T_{offset}$ may be configured such that $T_{offset} \leq T_{proc,2}$. In some cases, $T_{offset}$ may be configured such that $T_{offset} \leq 2*T_{proc,2}$. In some cases, $T_{offset}$ may be configured to be a set amount of time. For example, $T_{offset}$ may be configured to be a set period of time, which may be less than 4 ms.

Additional techniques for conveying effective timing gap values to UE 115-*a* are described herein. In some cases, base station 105-*a* may indicate a default timing gap value as well as an offset, or additional value (gap) to be used when in a dual-connectivity configuration (e.g., an NR-NR dual connectivity configuration). UE 115-*a* may determine the effective timing gap value based on combining, or adding, the default timing gap value and the offset. In some cases, base station 105-*a* may indicate an effective timing gap value to UE 115-*a* more explicitly, for example by including the effective timing gap value in a message or in a set of potential timing gap values (e.g., as a minimum value in the set of potential timing gap values). In some cases, offsets may be slot-specific. For example, a first set of slots may have a first offset, and a second set of slots may have a second offset. These and other techniques are described in more detail FIGS. 3 and 4.

In some cases, a UE 115 may wait N symbols before an uplink transmission to determine uplink transmit parameters. For example, the UE may wait N1 symbols before setting uplink transmit parameters for a PUCCH transmission and wait N2 symbols before setting uplink transmit parameters for a PUSCH transmission. The timing gap N1 may correspond to a minimum number of symbols needed for the UE 115 to process PDSCH and send HARQ feedback (e.g., ACK/NACK). Therefore, the timing gap N1 may correspond to a gap between the end of PDSCH and the beginning of PUCCH resources used for HARQ-ACK. Thus, PDSCH should end at least N1 symbols earlier than the PUCCH resource begins (e.g., K1 may be large enough to provide the gap). The timing gap N2 may be a similar timing gap between PDCCH carrying an uplink grant and PUSCH resources for an uplink shared channel transmission.

UE 115-a may have N1 and N2 values for the MCG and the SCG. For example, N_MCG 260 may be an example of an N1 or N2 value for the MCG communications 205, and N_SCG 265 may be an example of an N1 or N2 value for the SCG communications 210. In some cases, UE 115-a and base station 105-a may implement techniques such that K1 of the MCG is greater than both N1 the N2 of the SCG. As the SCG may have multiple component carriers, possibly with differing SCSs or different timing capabilities, K1 of the MCG may be configured to be greater than the largest N1 across all CCs of the SCG and greater than the N2 across all CCs of the SCG. Similarly, K2 of the MCG may be configured to be greater than the largest N1 across all CCs of the SCG and greater than the N2 across all CCs of the SCG.

In some cases, UE 115-a may add a transmission parameter offset to a default timing gap value for the MCG. For example, for the MCG, K1_MCG may be configured to be larger than or equal to the largest N1 and largest N2 of the SCG plus the N1 of the MCG. For example, $K1_{MCG}$=max($\{N1_{SCG}, N2_{SCG}\}$)+$N1_{MCG}$. Similarly, K2_MCG may be configured to be greater than or equal to the largest N1 and largest N2 of the SCG plus the N2 of the MCG. For example, $K2_{MCG}$=max($\{N1_{SCG}, N2_{SCG}\}$)+$N2_{MCG}$. Therefore, UE 115-a may select its parameters earlier for transmission on the MCG (e.g., for uplink transmissions of the MCG communications 205) than for transmission on the SCG. This may prevent UE 115-a from setting an Scell transmit power earlier than the MCG transmit power. If, for example, K1_MCG is at least as big as $N_{SCG}$+$N_{MCG}$, then UE 115-a may have sufficient time to set both uplink parameters. UE 115-a may be able to set MCG uplink power at least before beginning to process a downlink transmission on the SCG and beginning to select an uplink transmit power for the SCG. In some cases, transmission parameter offsets may be slot-specific. For example, a first set of slots may have a first transmission parameter offset, and a second set of slots may have a second transmission parameter offset. Therefore, these techniques may support UE 115-a and the base stations 105 prioritizing the MCG and selecting an uplink transmit power for the MCG prior to selecting an uplink transmit power for the SCG.

In some examples, K1 of the MCG may be greater than the maximum{max(N1 of SCG over all its CCs), max(N2 of the SCG over all its CCs)}. In some examples, K1=maximum{max(N1 of SCG over all its CCs), max(N2 of SCG over all its CCs)}+an offset. In some examples, the offset may be an example of a transmission parameter offset and may be the N1 of the actual uplink transmission of the MCG. A similarly configuration may be used for K2 of the MCG (e.g., $K2_{MCG}$ is greater than the maximum of (max(N1 of SCG over all its CCs), max(N2 of the SCG over all its CCs)) or $K2_{MCG}$ is equal to maximum{max(N1 of SCG over all its CCs), max(N2 of the SCG over all its CCs)}+an offset, but the offset in the case of K2 of the MCG may be N2 of the actual uplink transmission of the MCG.

Figure 3:
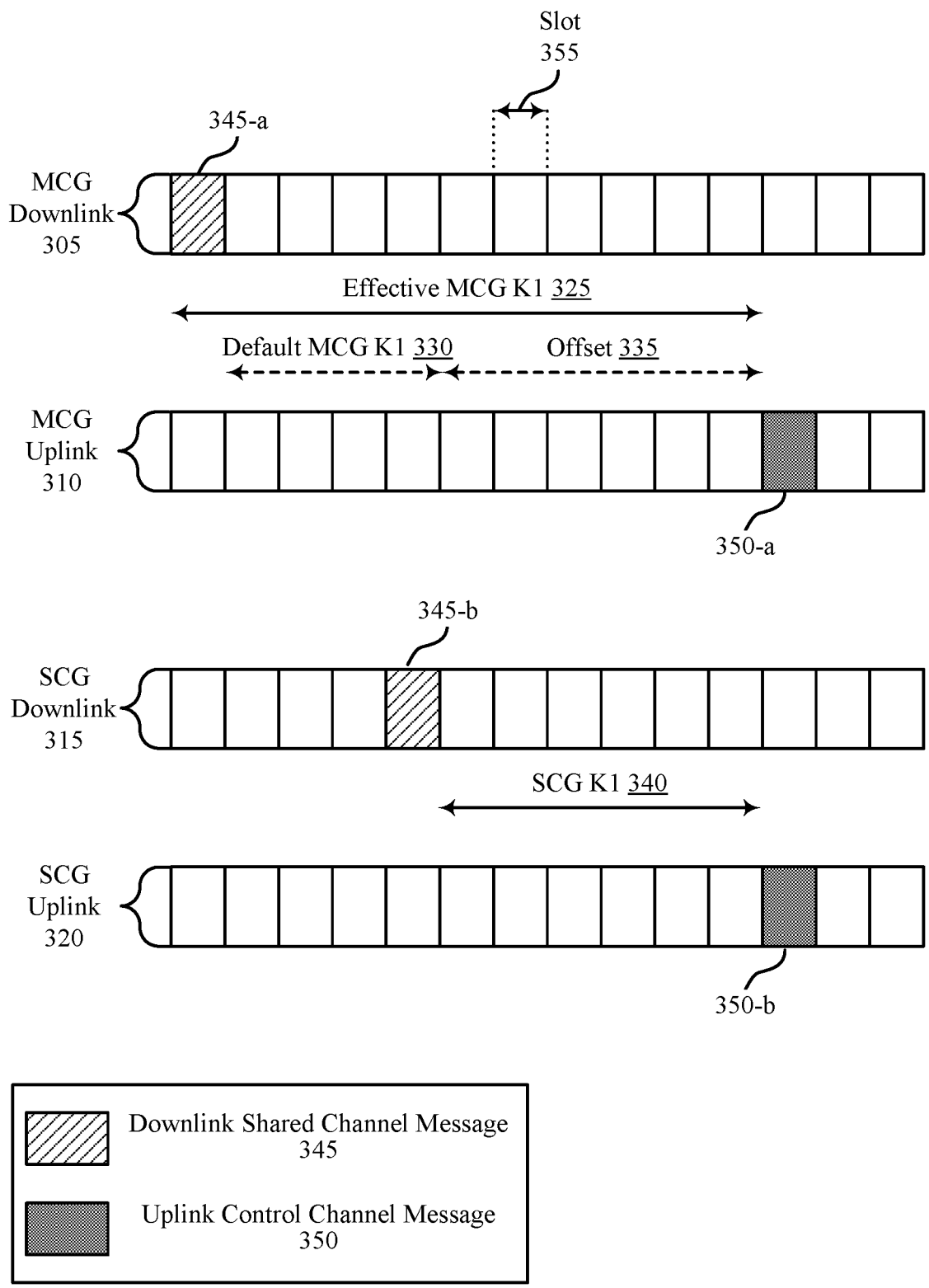
FIG. 3 illustrates an example of a K1 timing gap configuration that supports uplink power control for dual connectivity in accordance with aspects of the present disclosure.

FIG. 3 illustrates an example of a K1 timing gap configuration 300 that supports uplink power control for dual connectivity in accordance with aspects of the present disclosure. In some examples, K1 timing gap configuration 300 may implement aspects of wireless communication system 100.

As described in FIG. 2, a UE 115 may be configured for a dual connectivity configuration with two base stations 105. A first base station 105 may provide an MCG, and a second base station 105 may provide an SCG. The MCG may include a carrier for MCG downlink transmissions 305 and a carrier for MCG uplink transmissions 310. The SCG may include a carrier for SCG downlink transmissions 315 and SCG uplink transmissions 320. The UE 115 and base stations 105 may implement techniques to provide higher priority for the MCG. For example, some timing gaps for the MCG (e.g., K1 and K2) may be increased to be at least larger than some or all of the timing gaps for the SCG.

The timing gap K1 may refer to a time between a base station 105 transmitting a downlink shared channel message 345 (e.g., a data transmission) to a UE 115 and the UE 115 transmitting an uplink control channel message 350 (e.g., ACK/NACK feedback) in response. In some cases, the downlink shared channel message 345 may be an example of a semi-persistent scheduling (SPS) physical downlink shared channel (PDSCH) message. Thus, the base station 105 may transmit the PDSCH message at each SPS occasion. The SPS configuration and timing may, in some cases, be configured or triggered via DCI. Thus, in some cases, K1 may correspond to a timing gap, as a number of slots, between an SPS PDSCH message and HARQ feedback for the SPS PDSCH message.

In some cases, a value for K1 may be indicated in DCI. The DCI may be transmitted in a downlink control channel message (e.g., physical downlink control channel (PDCCH)) to the UE 115. The DCI message conveying the K1 value may, in some cases, be the same DCI which schedules the downlink shared channel message 345. How the K1 value is conveyed via DCI may be based on a DCI format. In some examples, the DCI may include a bit field (e.g., a PDSCH-to-HARQ-indicator field), and the value of the bit field may correspond to the K1 value. For example, if the bit field is 3 bits, possibly K1 values may span from 1 through 8 (e.g., {1, 2, 3, 4, 5, 6, 7, 8}), where a bit field value of '010' may correspond to a K1 value of 3 (e.g., the bit filed value may be an index of the set, so a binary value of 0 may correspond to a first entry in the set, and a binary value of 2 may correspond to a third entry of the set). In other examples, the bit field value may map to another set of default K1 values, or the bit field may be a different number of bits (e.g., 1 or 2 bits), which may lead to different number of possible default K1 values. A DCI format for this example may be DCI format 1_0.

In some examples, the bit field values may map to a set of numbers provided by a higher layer parameter. For example, instead of 1 through 8, the numbers mapping to the bit field may be configured by RRC. RRC signaling may configure the values of the bit field (e.g., set the values of the PDSCH-to-HARQ-indicator field), for example by a higher layer parameter such as a dl-DataToUL-ACK parameter. A DCI format for this example may be DCI format 1_1.

For downlink shared channel message 345 ending in slot n, the UE 115 receiving the downlink shared channel message 345 may transmit an uplink control channel message 350 in slot n+k. In this example, k may be an example of K1 provided by the PDSCH-to-HARQ timing-indicator field in DCI format 1_0 or, if present, in DCI format 1_1 activating the downlink shared channel message 345 (e.g., if the downlink shared channel message 345 is an SPS PDSCH message). For example, the UE 115 receives downlink shared channel message 345-b and, after a number of slots corresponding to the SCG K1 340, transmits uplink control channel message 350-b. The SCG K1 340 may be indicated in a downlink control channel message received from the second base station 105 providing the SCG.

The UE 115 and the base stations 105 may implement techniques so that an effective K1 value for the MCG (e.g., an effective MCG K1 325) is greater than the K1 value for the SCG (e.g., an SCG K1 340) and the K2 value for the SCG. The UE 115 may use the effective MCG K1 325 when communicating according to the dual connectivity configuration with the MCG and the SCG. In some cases, the UE 115 may use the effective MCG K1 325 in when an NR-NR dual connectivity configuration with the first base station 105 and the second base station 105.

In a first example, the first base station 105, providing the MCG, may indicate an offset 335 to the UE 115 in addition to a default MCG K1 330. The UE 115 may combine (e.g., add) with the default MCG K1 330 with the offset 335 to identify an effective MCG K1 325 which is longer than the SCG K1 340. In an illustrated example, the SCG K1 340 may span six slots 355, and the default MCG K1 330 may span four slots 355. Therefore, to ensure that the effective MCG K1 325 is greater than the SCG K1 340, the first base station 105 may indicate an additional gap timing (e.g., the offset 335) of six slots 355. The UE 115 may add the offset 335 to the default MCG K1 330 such that the effective MCG K1 is eleven slots 355 and greater than the SCG K1 340.

The default MCG K1 330 may be indicated via DCI of format 1_0 or format 1_1. For example, the first base station 105 may indicate the default MCG K1 330 via the PDSCH-to-HARQ-indicator field. The offset 335 may be indicated in the DCI message (e.g., carrying the PDSCH-to-HARQ-indicator field), via an RRC message (e.g., an RRC establishment, configuration, re-configuration, etc.), or via a MAC CE. The duration of the offset 335 may be set so that any possible K1 value for the default MCG K1 330 is greater than the SCG K1 340 when the offset 335 is added. Thus, any value for the effective MCG K1 325 is greater than the SCG K1 340. In some cases, the set of possible values for the effective MCG K1 325 may also be greater than an SCG K2 value.

In some cases, the offset 335 may be specific to the UE 115. For example, multiple UEs 115 may be configured with offsets 335. In some cases, the UEs 115 may each have different offsets 335, or there may not be a correlation between an offset 335 of a first UE 115 and an offset 335 of a second UE 115. Or, in some cases, the value of the offset 335 may be based on an identifier or characteristic of the UE 115. In some examples, offset 335 may be based on a subcarrier spacing (SCS) of the MCG. For example, different SCS configurations may result in different offsets 335. In some examples, this first example may be used in situations where PDSCH is scheduled, or SPS is activated, by DCI format 1_0. However, these techniques may also be applicable for other DCI formats, such as DCI format 1_1.

In a second example, the UE 115 may be configured with an additional parameter which ensures the effective MCG K1 325 is larger than the SCG K1 340. For example, the higher layer parameter may increase a size of values mapped to the bit field (e.g., the PDSCH-to-HARQ-indicator field). Thus, any value of K1 mapping to the bit field may be greater than the SCG K1 340. In this example, the UE 115 may not receive an indication for the offset 340, as the indicated MCG K1 may be greater than the SCG K1 340. In some cases, each MCG K1 value of the set MCG K1 values mapping to the bit field may be greater than the SCG K1 340.

In a third example, the UE 115 may be configured with a minimum MCG K1 value. In this example, the UE 115 may always use an effective MCG K1 325 of at least the minimum K1 value. If the UE 115 is indicated a default MCG K1 330 which is smaller than the minimum K1 value, the UE 115 may instead use the minimum MCG K1 value. In an example where the UE 115 is indicated an MCG K1 which is greater than the minimum MCG K1 value, the UE 115 may use either the minimum MCG K1 value or the indicated MCG K1 value. In some examples, the minimum MCG K1 value may be based on UE capability. The UE 115 may report its capability to the first base station 105. The base station 105 may determine a minimum MCG K1 value based on the UE's capability and configure the UE 115 with the minimum MCG K1 value based on the UE capability.

Figure 4:
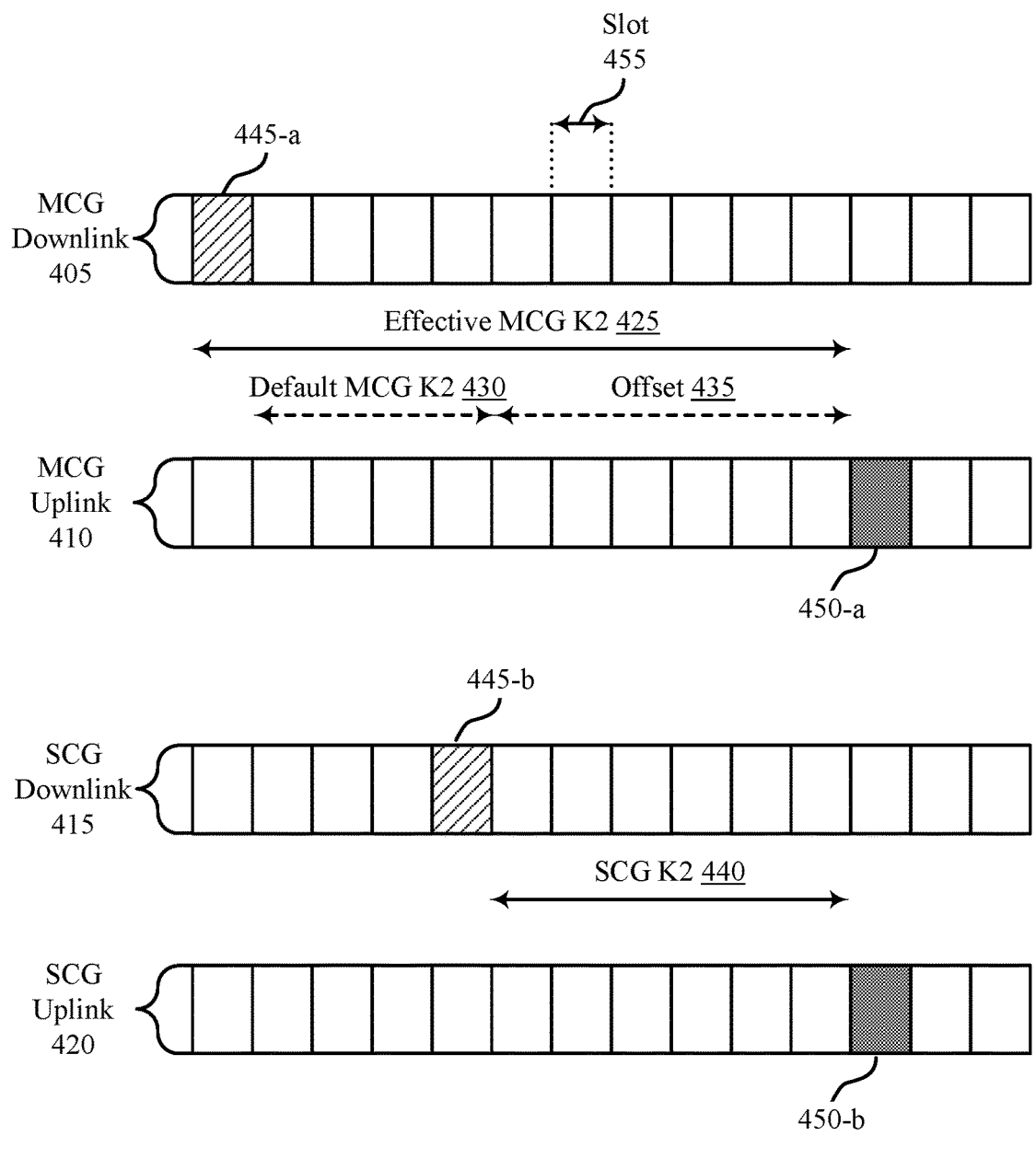
FIG. 4 illustrates an example of a K2 timing gap configuration that supports uplink power control for dual connectivity in accordance with aspects of the present disclosure.

FIG. 4 illustrates an example of a K2 timing gap configuration 400 that supports uplink power control for dual connectivity in accordance with aspects of the present disclosure. In some examples, K2 timing gap configuration 400 may implement aspects of wireless communication system 100.

The K2 timing gap configuration 400 may include similar aspects of the K1 timing gap configuration 300 described with reference to FIG. 3. A UE 115 may be configured for a dual connectivity configuration with two base stations 105, where a first base station 105 provides an MCG, and a second base station 105 provides an SCG. The MCG may include a carrier for MCG downlink transmissions 405 and a carrier for MCG uplink transmissions 410. The SCG may include a carrier for SCG downlink transmissions 415 and SCG uplink transmissions 420. The UE 115 and base stations 105 may implement techniques to provide higher priority for the MCG. The K2 timing gap configuration 400 may describe some techniques to increase an effective MCG K2 425.

The timing gap K2 may refer to a time between a base station 105 transmitting a downlink control channel message 445 (e.g., DCI carrying a grant to schedule uplink resources) to a UE 115 and the UE 115 transmitting an uplink shared channel message 450 (e.g., a PUSCH message or an uplink data message) in response.

In some cases, a value for K2 may be indicated in DCI. The DCI may be transmitted in a downlink control channel message 445 (e.g., PDCCH) to the UE 115. The DCI message conveying the K2 value may, in some cases, be the same DCI which schedules the uplink shared channel message 450. In some cases, the DCI may configure an allocation for uplink shared channel resources. For example, there may be multiple PUSCH time domain resource allocation configurations, and the DCI may include an indicator for which PUSCH time domain resource allocation configuration the UE 115 is to apply. In some cases, the UE 115 may identify the PUSCH configuration from a default PUSCH time domain allocation table. The PUSCH configurations in the default table may not be configurable or may be specified by the network.

In some cases, the UE 115 may identify a PUSCH time domain resource allocation configuration from a higher layer-configured time domain allocation list. The time domain allocation list (e.g., pusch-TimeDomainAllocation-List) may be configured via a common PUSCH configuration (e.g., pusch-ConfigCommon) or a UE-specific PUSCH configuration (e.g., pusch-Config). In some cases, the time domain allocation list may be configured via RRC, and a base station 105 may indicate to the UE 115 which PUSCH configuration of the list to use via an indicator in DCI. A PUSCH time domain allocation configuration may correspond to a K2 value, as the UE 115 may identify when to transmit PUSCH based on the PUSCH time domain allocation configurations. In some cases, the K2 value may be explicitly indicated in the PUSCH time domain allocation configuration, or the K2 value may be implicitly indicated based on when the PUSCH resources are assigned.

For downlink control channel message 445 ending in slot n, the UE 115 receiving the downlink control channel message 445 may transmit an uplink shared channel message 450 in slot n+k. In this example, k may be an example of K2 provided by the PUSCH time domain resource allocation configuration, which may be one of a set of possible configurations in a table of default PUSCH configurations or a higher layer-configured time domain allocation list. For example, the UE 115 receives downlink control channel message 445-b and, after a number of slots corresponding to the SCG K2 440, transmits uplink shared channel message 450-b. The SCG K2 440 may be based on downlink control channel message 445-b received from the second base station 105 providing the SCG.

The UE 115 and the base stations 105 may implement techniques so that an effective K2 value for the MCG (e.g., an effective MCG K2 425) is greater than the K2 value for the SCG (e.g., an SCG K2 340) and the K1 value for the SCG. The UE 115 may use the effective MCG K2 425 when communicating according to the dual connectivity configuration with the MCG and the SCG. In some cases, the UE 115 may use the effective MCG K2 425 in when an NR-NR dual connectivity configuration with the first base station 105 and the second base station 105. In some examples, these techniques may be applied to PUSCH scheduling on the serving cells of the MCG.

In a first example, the first base station 105, providing the MCG, may indicate an offset 435 to the UE 115 in addition to a default MCG K2 430. The UE 115 may combine (e.g., add) with the default MCG K2 430 with the offset 435 to identify an effective MCG K2 425 which is longer than the SCG K2 440. In an illustrated example, the SCG K2 440 may span six slots 455, and the default MCG K2 430 may span four slots 455. Therefore, to ensure that the effective MCG K2 425 is greater than the SCG K2 440, the first base station 105 may indicate an additional gap timing (e.g., the offset 435) of six slots 455. The UE 115 may add the offset 435 to the default MCG K2 430 such that the effective MCG K2 is eleven slots 455 and greater than the SCG K2 340.

In some cases, the offset 435 may be used when the UE 115 identifies a PUSCH configuration from the default table. The offset 435 may be configured such that any PUSCH configuration from the default table, when combined with the offset 435, is larger than the SCG K2 440. In some cases, the offset 435 may also be used in cases where the UE 115 identifies the PUSCH configuration from the list (e.g., the time domain allocation list) configured by a higher layer and provided by either the common PUSCH configuration (e.g., pusch-ConfigCommon) or UE-specific PUSCH configuration (e.g., pusch-Config).

In some cases, the offset 435 may be specific to the UE 115. For example, multiple UEs 115 may be configured with offsets 435. In some cases, the UEs 115 may each have different offsets 435, or there may not be a correlation between an offset 435 of a first UE 115 and an offset 435 of a second UE 115. Or, in some cases, the value of the offset 435 may be based on an identifier or characteristic of the UE 115. In some examples, offset 435 may be based on an SCS of the MCG. For example, different SCS configurations may result in different offsets 435. As an example, the effective MCG K2 425 may be equal to the default MCG K2 430+the offset 435+a value X, where X is different for different SCS configurations. The offset 435 (e.g., an MCG K2 offset) may be the same, or a different, value than the offset 335 (e.g., an MCG K1 offset) described with reference to FIG. 3. In some cases, the offset for MCG K1 may not be based on the offset for MCG K2. In some other cases, the offset for MCG K1 may be based on the offset for MCG K2, or the offset for MCG K2 may be based on the offset for MCG K1.

In a second example, the UE 115 may be configured with a separate list of PUSCH configurations. The separate list of PUSCH configurations may be provided by the common PUSCH configuration or the UE-specific PUSCH configuration. The UE 115 may be provided with these separate lists based on operating in an NR-NR dual connectivity configuration. In some cases, the minimum MCG K2 value in these separate lists may be larger than those used for non-dual connectivity operation.

In a third example, the UE 115 may be configured with a minimum MCG K2 value. In this example, the UE 115 may always use an effective MCG K2 425 of at least the minimum K2 value. If the UE 115 is indicated a default MCG K2 430 which is smaller than the minimum K2 value, the UE 115 may instead use the minimum MCG K2 value. In an example where the UE 115 is indicated an MCG K2 which is greater than the minimum MCG K2 value, the UE 115 may use either the minimum MCG K2 value or the indicated MCG K2 value. In some examples, the minimum MCG K2 value may be based on UE capability. The UE 115 may report its capability to the first base station 105. The base station 105 may determine a minimum MCG K2 value based on the UE's capability and configure the UE 115 with the minimum MCG K2 value based on the UE capability.

Figure 5:
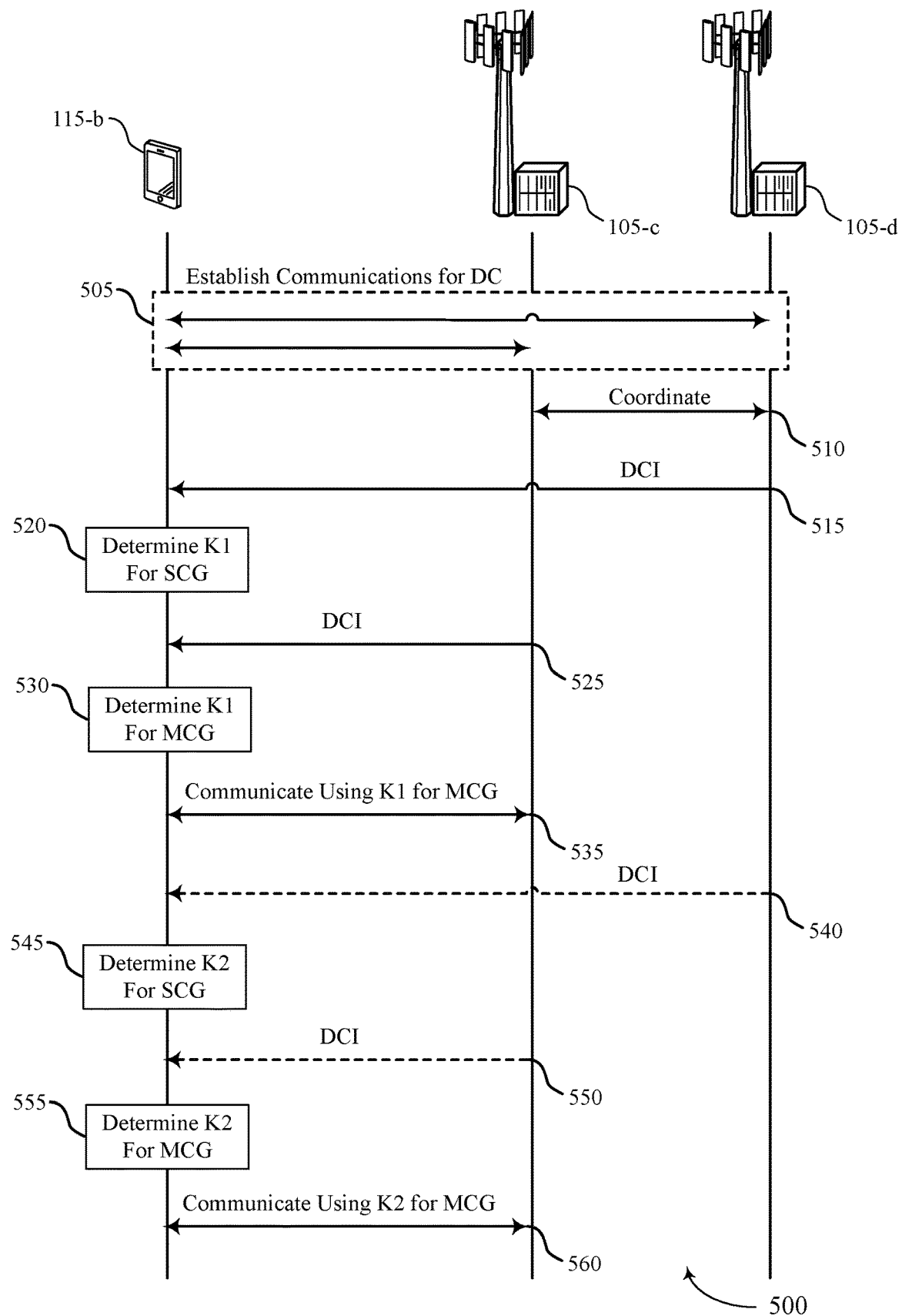
FIG. 5 illustrates an example of a process flow that supports uplink power control for dual connectivity in accordance with aspects of the present disclosure.

FIG. 5 illustrates an example of a process flow 500 that supports uplink power control for dual connectivity in accordance with aspects of the present disclosure. In some examples, process flow 500 may implement aspects of wireless communication system 100. Process flow 500 may include UE 115-b, base station 105-c, and base station 105-d. UE 115-b may be an example of a UE 115 as described herein. Base stations 105-c and 105-d may be examples of base stations 105 as described herein.

At 505, UE 115-b may establish communications with base station 105-c and base station 105-d in accordance with a dual connectivity configuration. In this example, base station 105-c may provide an MCG, and base station 105-d may provide an SCG. UE 115-b may communicate with both base station 105-c and base station 105-d according to NR communications (e.g., and NR-NR dual connectivity configuration). The MCG may generally be used for mobility and coverage. Therefore, the MCG may be able to operate slower (e.g., with reference to timing gaps such as K1 and K2) than the SCG. UE 115-b, base station 105-c, and base station 105-*d* may implement techniques to give the MCG higher priority and increase the timing gaps K1 and K2 for the MCG. This may prevent introducing phase shift or phase discontinuity in the case of simultaneous transmission in the dual connectivity configuration.

At 510, base station 105-*c* and base station 105-*d* may coordinate or communicate (e.g., over a backhaul link). Base station 105-*c* and base station 105-*d* may exchange information related to uplink timing information for UE 115-*b*.

At 515, UE 115-*b* may receive a downlink control channel transmission (e.g., a PDCCH transmission) carrying DCI from base station 105-*d*. Base station 105-*d* may indicate a K1 value for the SCG in the DCI. At 520, UE 115-*b* may determine a second uplink timing gap (e.g., an SCG K1) for communications with base station 105-*d*.

At 525, UE 115-*b* may receive a downlink control channel transmission (e.g., a PDCCH transmission) carrying DCI from base station 105-*c*. Base station 105-*c* may indicate a K1 value for the MCG in the DCI. At 530, UE 115-*b* may determine, based on being in the dual connectivity configuration, a first uplink timing gap (e.g., an effective MCG K1) for communications with base station 105-*c*, where the first uplink timing gap is determined to be greater than the second uplink timing gap (e.g., MCG K1 is greater than SCG K1).

In some cases, UE 115-*b* may identify the first uplink timing gap based on one of the techniques described with reference to FIG. 3. For example, UE 115-*b* may receive, from base station 105-*c*, an indication of a default uplink timing gap for communications with base station 105-*c*. UE 115-*b* may receive, from base station 105-*c*, an indication of an additional uplink timing gap for communications with base station 105-*c* when in the dual connectivity configuration, and UE 115-*b* may determine the first uplink timing gap based on a combination of the default uplink timing gap and the additional uplink timing gap. In some cases, the additional uplink timing gap may be an example of an offset (e.g., a K1 offset) described in the first example with reference to the FIG. 3.

In some examples, UE 115-*b* may receive, from base station 105-*c*, an indication of a set of uplink timing gaps that is based on the dual connectivity configuration, where a smallest entry in the set of uplink timing gaps is configured to be larger than the second uplink timing gap. UE 115-*b* may then receive, from base station 105-*c*, an indication of the first uplink timing gap, where the indication includes an index for the set of uplink timing gaps. This may, in some cases, correspond to the second example described with reference to FIG. 3.

In some cases, UE 115-*b* may receive an indication of a minimum uplink timing gap for communications with base station 105-*c* when in the dual connective configuration. UE 115-*b* may receive, from base station 105-*b*, an indication of an uplink timing gap that is smaller than the minimum uplink timing gap, and UE 115-*b* may determine the first uplink timing gap as equal to the minimum uplink timing gap. This may, in some cases, correspond to the third example described with reference to FIG. 3.

In some examples, UE 115-*b* may assign a first priority to transmit power determinations for uplink communications with base station 105-*c*, where the first priority is higher than a second priority associated with transmit power determinations for uplink communications with base station 105-*d*. For example, UE 115-*b* may set an uplink transmit power for communications with the MCG (e.g., base station 105-*c*) first. Then, UE 115-*b* may set an uplink transmit power for communications with the SCG (e.g., base station 105-*d*) based on the uplink transmit power for the MCG and a remaining uplink transmit power budget. By adjusting the timing configuration for the MCG (e.g. and increasing $K1_{MCG}$ and $K2_{MCG}$), the MCG may have more time to set its transmit power ahead of the SCG.

UE 115-*b* and base station 105-*c* may then communicate based on the first uplink timing gap at 535. For example, UE 115-*b* may receive a downlink shared channel message from the first base station in a first slot and transmit a feedback message for the downlink shared channel message to the first base station in a second slot, where the first slot and the second slot are separated by the first uplink timing gap. In some cases, offsets may be slot-specific. For example, a first set of slots may have a first offset, and a second set of slots may have a second offset.

In some examples, at 540, base station 105-*d* may transmit an indication of an SCG K2 value. Or, in some cases, the SCG K2 value may be included in the DCI transmitted at 515, or another DCI. UE 115-*b* may determine a third uplink timing gap for a second type of communications with base station 105-*d*, where the first uplink timing gap is determined to be greater than the third uplink timing gap. In some cases, at 550, base station 105-*c* may transmit an indicator of an MCG K2 value. Or, in some cases, the MCG K2 value may be included in the DCI transmitted at 515, or another DCI.

At 555, UE 115-*b* may determine, based on being in the dual connectivity configuration, a fourth uplink timing gap for the second type of communications with base station 105-*c*, where the fourth uplink timing gap is determined to be greater than the second uplink timing gap and the third uplink timing gap.

In some cases, to determine the fourth uplink timing gap (e.g., MCG K2), UE 115-*b* may receive, from base station 105-*c*, an indication of a default uplink timing gap for the second type of communications with base station 105-*c*. UE 115-*b* may receive, from base station 105-*b*, an indication of an additional uplink timing gap for the second type of communications with the base station 105-*b* when in the dual connectivity configuration, and UE 115-*b* may determine the fourth uplink timing gap based on a combination of the default uplink timing gap for the second type of communications and the additional uplink timing gap for the second type of communications. The additional uplink timing gap for the second type of communications may be an example of a K2 offset (e.g., an offset 430) described with reference to FIG. 4. This may, in some cases, be an example of the first example described with reference to FIG. 4.

In some cases, to determine the fourth uplink timing gap, UE 115-*b* may receive, from base station 105-*c*, an indication of a second set of uplink timing gaps that is based on the dual connectivity configuration, where a smallest entry in the second set of uplink timing gaps is configured to be greater than the third uplink timing gap. UE 115-*b* may receive, from base station 105-*c*, an indication of the fourth uplink timing gap, where the indication includes an index for the second set of uplink timing gaps. This may, in some cases, be an example of the second example described with reference to FIG. 4.

In some cases, UE 115-*b* may receive an indication of a minimum uplink timing gap for the second type of communications with base station 105-*c* when in the dual connective configuration. UE 115-*b* may receive, from base station 105-*c*, an indication of an uplink timing gap for the second type of communications that is smaller than the minimum uplink timing gap for the second type of communications when in the dual connective configuration, and UE 115-*b* may determine the fourth uplink timing gap as equal to the minimum uplink timing gap for the second type of communications. This may be an example of the third example as described with reference to FIG. 4.

At 560, UE 115-b and base station 105-c may communicate based on the fourth uplink timing gap. For example, UE 115-b may receive a downlink control channel message from base station 105-c in a first slot, where the downlink control channel message schedules an uplink shared channel message for UE 115-b. UE 115-b may then transmit the uplink shared channel message to base station 105-c in a second slot, where the first slot and the second slot are separated by the fourth uplink timing gap.

Figure 6:
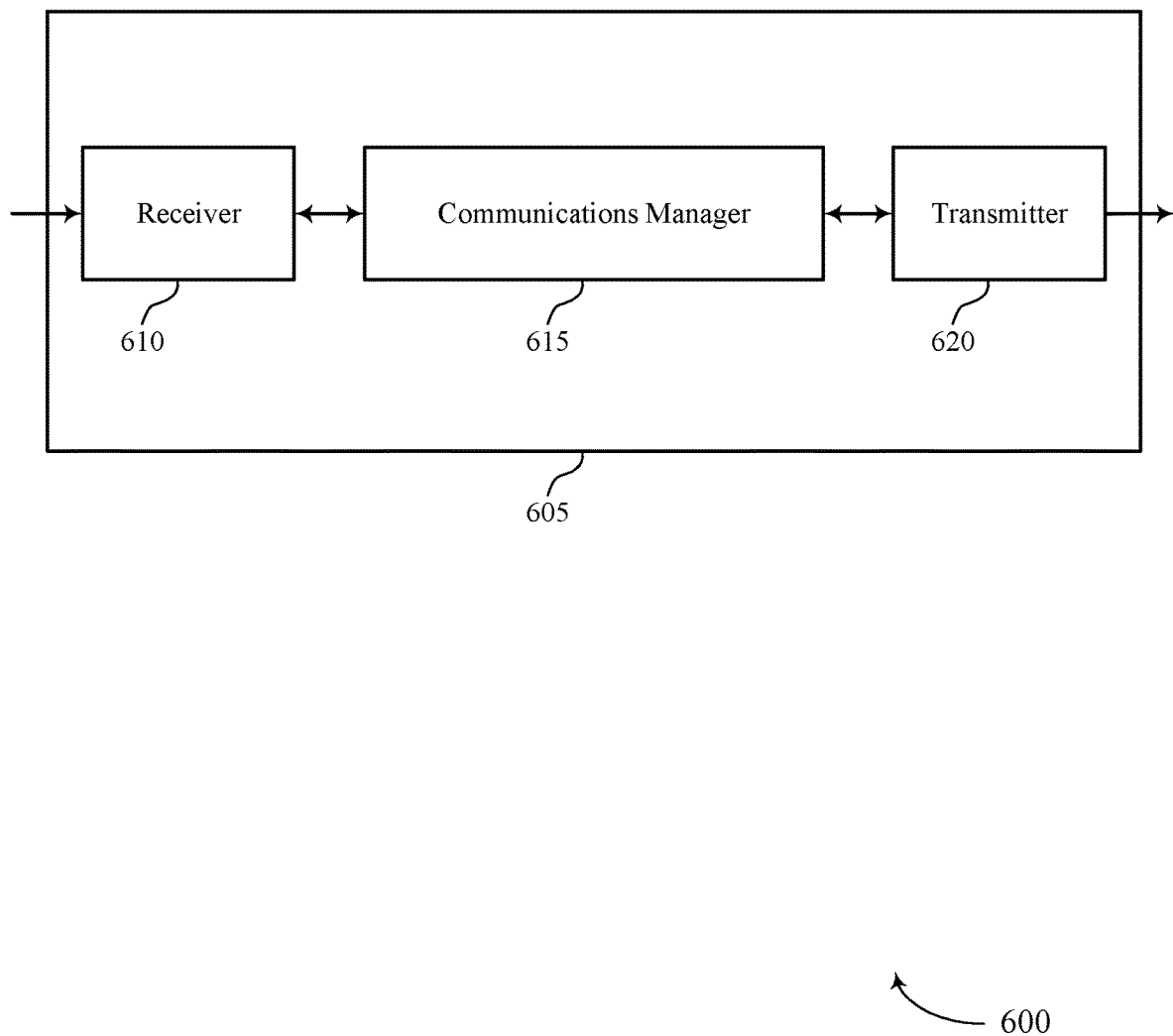
FIGS. 6 and 7 show block diagrams of devices that support uplink power control for dual connectivity in accordance with aspects of the present disclosure.

FIG. 6 shows a block diagram 600 of a device 605 that supports uplink power control for dual connectivity in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to uplink power control for dual connectivity, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may establish communications with a first base station and a second base station in accordance with a dual connectivity configuration, determine a second uplink timing gap for communications with the second base station, determine, based on being in the dual connectivity configuration, a first uplink timing gap for communications with the first base station, where the first uplink timing gap is determined to be greater than the second uplink timing gap, and communicate with the first base station based on the first uplink timing gap.

In some cases, the communications manager 615 may establish communications with a first base station and a second base station in accordance with a dual connectivity configuration, determine a first uplink timing gap for communications with the first base station, where the first uplink timing gap is based on the UE being in the dual connectivity configuration and is larger than a second uplink timing gap for communications with the second base station, assign a first priority to transmit power determinations for uplink communications with the first base station, where the first priority is higher than a second priority associated with transmit power determinations for uplink communications with the second base station, and communicate with the first base station based on the first uplink timing gap and the first priority and with the second base station based on the second uplink timing gap and the second priority. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
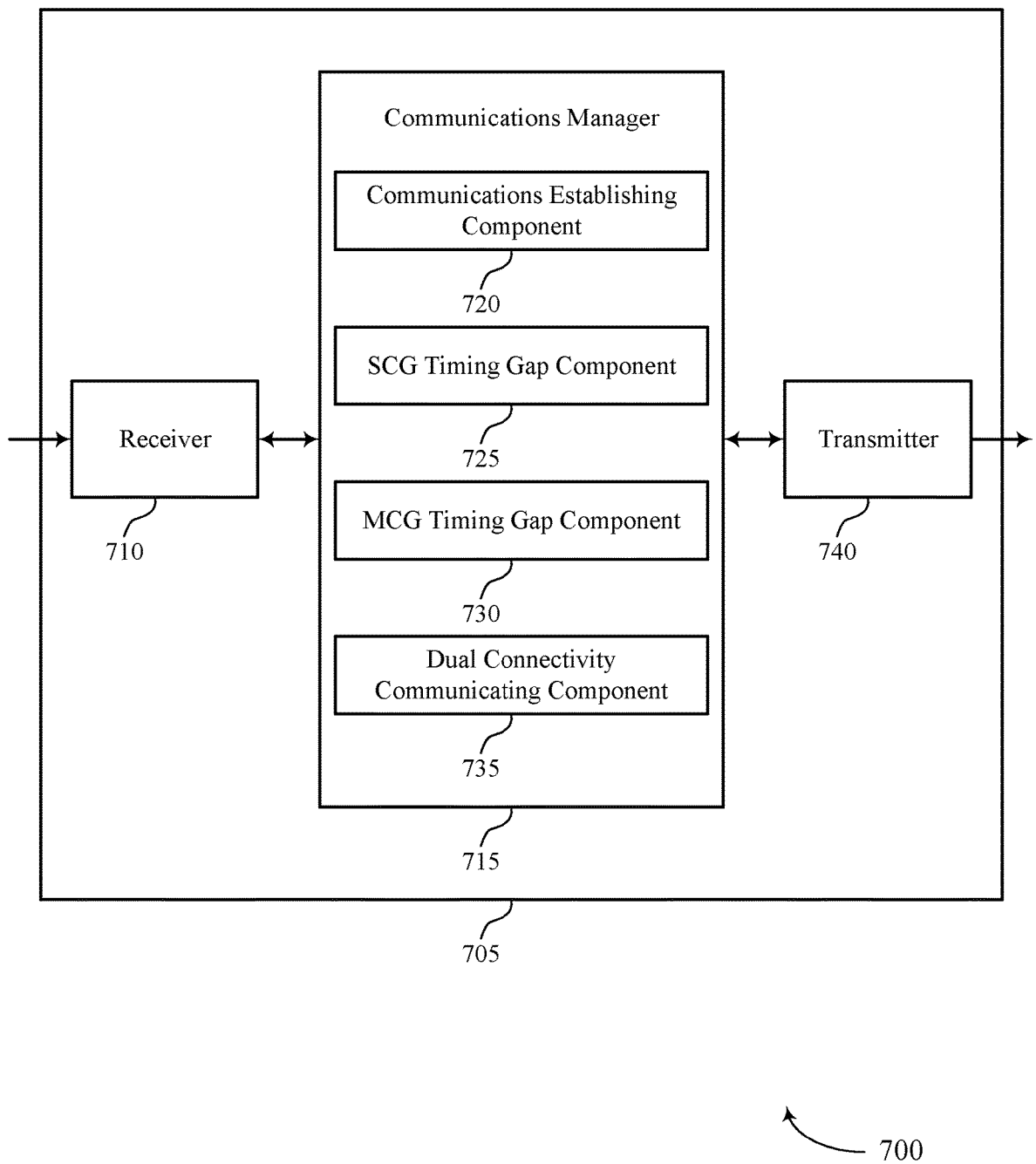

FIG. 7 shows a block diagram 700 of a device 705 that supports uplink power control for dual connectivity in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to uplink power control for dual connectivity, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a communications establishing component 720, a SCG timing gap component 725, a MCG timing gap component 730, and a dual connectivity communicating component 735. The communications manager 715 may be an example of aspects of the communications manager 910 described herein.

The communications establishing component 720 may establish communications with a first base station and a second base station in accordance with a dual connectivity configuration. The SCG timing gap component 725 may determine a second uplink timing gap for communications with the second base station. The MCG timing gap component 730 may determine, based on being in the dual connectivity configuration, a first uplink timing gap for communications with the first base station, where the first uplink timing gap is determined to be greater than the second uplink timing gap. The dual connectivity communicating component 735 may communicate with the first base station based on the first uplink timing gap.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
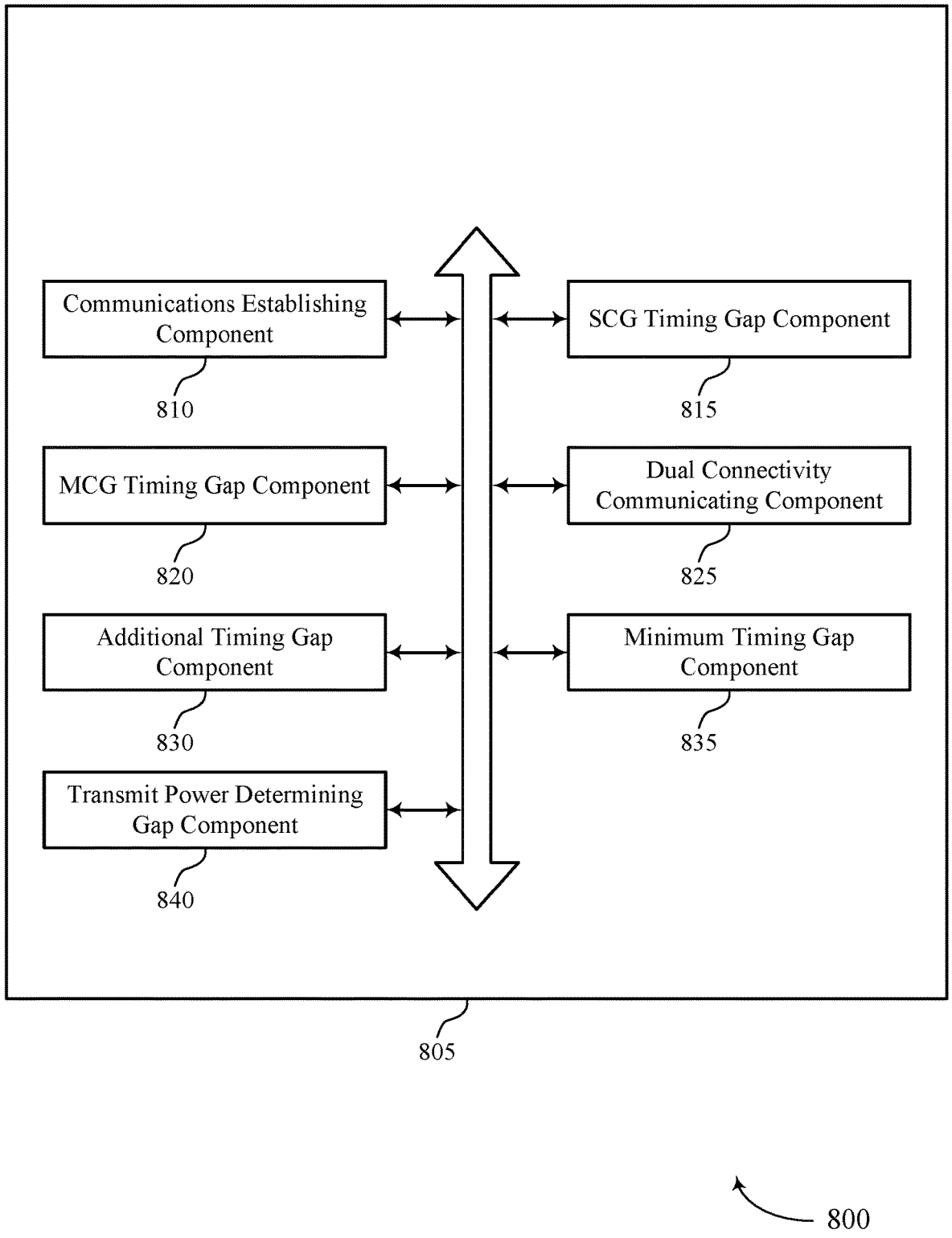
FIG. 8 shows a block diagram of a communications manager that supports uplink power control for dual connectivity in accordance with aspects of the present disclosure.

FIG. 8 shows a block diagram 800 of a communications manager 805 that supports uplink power control for dual connectivity in accordance with aspects of the present disclosure. The communications manager 805 may be an example of aspects of a communications manager 615, a communications manager 715, or a communications manager 910 described herein. The communications manager 805 may include a communications establishing component 810, a SCG timing gap component 815, a MCG timing gap component 820, a dual connectivity communicating component 825, an additional timing gap component 830, and a minimum timing gap component 835. Each of these modules may communicate, directly or indirectly, with one another (e.g., via one or more buses).

The communications establishing component 810 may establish communications with a first base station and a second base station in accordance with a dual connectivity configuration. The SCG timing gap component 815 may determine a second uplink timing gap for communications with the second base station. In some examples, the SCG timing gap component 815 may determine a third uplink timing gap for a second type of communications with the second base station, where the first uplink timing gap is determined to be greater than the third uplink timing gap. In some cases, the second uplink timing gap includes a gap between receiving a downlink transmission from the second base station and transmitting a corresponding uplink transmission to the second base station.

The MCG timing gap component 820 may determine, based on being in the dual connectivity configuration, a first uplink timing gap for communications with the first base station, where the first uplink timing gap is determined to be greater than the second uplink timing gap. In some examples, the MCG timing gap component 820 may receive, from the first base station, an indication of a set of uplink timing gaps that is based on the dual connectivity configuration, where a smallest entry in the set of uplink timing gaps is configured to be larger than the second uplink timing gap. In some examples, the MCG timing gap component 820 may receive, from the first base station, an indication of the first uplink timing gap, where the indication includes an index for the set of uplink timing gaps.

In some examples, the MCG timing gap component 820 may receive, from the first base station, an indication of the first uplink timing gap based on DCI, an RRC message, or any combination thereof. In some examples, the MCG timing gap component 820 may receive, from the first base station, an indication of the fourth uplink timing gap via an RRC message.

In some examples, the MCG timing gap component 820 may determine, based on being in the dual connectivity configuration, a fourth uplink timing gap for the second type of communications with the first base station, where the fourth uplink timing gap is based at least in part on the dual connectivity configuration and is determined to be larger than the second uplink timing gap and the third uplink timing gap.

In some examples, the MCG timing gap component 820 may receive, from the first base station, an indication of a second set of uplink timing gaps that is based on the dual connectivity configuration, where a smallest entry in the second set of uplink timing gaps is configured to be greater than the third uplink timing gap. In some examples, the MCG timing gap component 820 may receive, from the first base station, an indication of the fourth uplink timing gap, where the indication includes an index for the second set of uplink timing gaps. In some cases, the first uplink timing gap is larger than a timing gap for communications with the first base station when the UE is not in the dual connectivity configuration. In some cases, the first uplink timing gap includes a gap between receiving a downlink transmission from the first base station and transmitting a corresponding uplink transmission to the first base station.

The dual connectivity communicating component 825 may communicate with the first base station based on the first uplink timing gap. In some cases, the first type of communications includes uplink control channel transmissions, and the second type of communications includes uplink shared channel transmissions.

In some examples, the dual connectivity communicating component 825 may receive a downlink shared channel message from the first base station in a first slot. In some examples, the dual connectivity communicating component 825 may transmit a feedback message for the downlink shared channel message to the first base station in a second slot, where the first slot and the second slot are separated by the first uplink timing gap.

In some examples, the dual connectivity communicating component 825 may receive a downlink control channel message from the first base station in a first slot, where the downlink control channel message schedules an uplink shared channel message for the UE. In some examples, the dual connectivity communicating component 825 may transmit the uplink shared channel message to the first base station in a second slot, where the first slot and the second slot are separated by the fourth uplink timing gap.

The dual connectivity communicating component 825 may determine that the uplink transmission to the first base station and the uplink transmission to the second base station at least partially overlap in time. In some examples, the dual connectivity communicating component 825 may determine a first transmit power for an uplink transmission to the first base station. In some examples, the dual connectivity communicating component 825 may determine a second transmit power for an uplink transmission to the second base station based on a difference between a transmit power limit and the first transmit power.

The additional timing gap component 830 may receive, from the first base station, an indication of a default uplink timing gap for communications with the first base station. In some examples, the additional timing gap component 830 may receive, from the first base station, an indication of an additional uplink timing gap for communications with the first base station when in the dual connectivity configuration.

In some examples, the additional timing gap component 830 may determine the first uplink timing gap based on a combination of the default uplink timing gap and the additional uplink timing gap. In some examples, the additional timing gap component 830 may receive an indication of a set of uplink timing gaps for communications with the first base station.

In some examples, the additional timing gap component 830 may identify the default uplink timing gap from the set of uplink timing gaps based on the indication of the default uplink timing gap, where the indication includes an index for the set of uplink timing gaps.

In some examples, the additional timing gap component 830 may identify an SCS for communications with the first base station. In some examples, the additional timing gap component 830 may determine the additional uplink timing gap for communications with the first base station based on the SCS.

In some examples, the additional timing gap component 830 may receive, from the first base station, an indication of a default uplink timing gap for the second type of communications with the first base station. In some examples, the additional timing gap component 830 may receive, from the first base station, an indication of an additional uplink timing gap for the second type of communications with the first base station when in the dual connectivity configuration.

In some examples, the additional timing gap component 830 may determine the fourth uplink timing gap based on a combination of the default uplink timing gap for the second type of communications and the additional uplink timing gap for the second type of communications. In some examples, the additional timing gap component 830 may determine the additional uplink timing gap for the second type of communications based on the SCS. In some cases, the additional uplink timing gap is specific to the UE. In some cases, the additional uplink timing gap for the second type of communications is specific to the UE.

In some cases, the indication of the default uplink timing gap for the second type of communications is received based on a PUSCH configuration. In some cases, the PUSCH configuration includes a time domain allocation list for the second type of communications, and where the default uplink timing gap is identified from the time domain allocation list.

The minimum timing gap component 835 may receive an indication of a minimum uplink timing gap for communications with the first base station when in the dual connective configuration. In some examples, the minimum timing gap component 835 may receive, from the first base station, an indication of an uplink timing gap that is smaller than the minimum uplink timing gap. In some examples, the minimum timing gap component 835 may determine the first uplink timing gap as equal to the minimum uplink timing gap.

In some examples, the minimum timing gap component 835 may report capability of the UE to the first base station, where the minimum uplink timing gap is based on the capability. In some examples, the minimum timing gap component 835 may receive an indication of a minimum uplink timing gap for the second type of communications with the first base station when in the dual connective configuration.

In some examples, the minimum timing gap component 835 may receive, from the first base station, an indication of an uplink timing gap for the second type of communications that is smaller than the minimum uplink timing gap for the second type of communications when in the dual connective configuration. In some examples, the minimum timing gap component 835 may determine the fourth uplink timing gap as equal to the minimum uplink timing gap for the second type of communications.

In some examples, the minimum timing gap component 835 may report a capability of the UE to the first base station, where the minimum uplink timing gap for the second type of communications is based on the capability.

The transmit power determining gap component 840 may communicate with the second base station via a set of component carriers associated with a corresponding set of uplink timing gaps, where the second uplink timing gap is a largest one of the corresponding set of uplink timing gaps. In some cases, the first uplink timing gap includes a gap between receiving a downlink transmission from the first base station and transmitting a corresponding uplink transmission to the first base station. In some cases, the second uplink timing gap includes a gap between determining a transmit power for an uplink transmission to the second base station and transmitting the uplink transmission to the second base station. In some cases, the corresponding set of uplink timing gaps are for uplink control channel transmissions. In some cases, the set of component carriers are associated with a second corresponding set of uplink timing gaps for uplink shared channel transmissions. In some cases, the second uplink timing gap is a largest one of the corresponding set of uplink timing gaps and the second corresponding set of uplink timing gaps.

In some cases, a third uplink timing gap includes a gap between determining a transmit power for an uplink transmission to the first base station and transmitting the uplink transmission to the second base station, and where the first uplink timing gap is based on a combination of the second uplink timing gap and the third uplink timing gap. In some cases, the first uplink timing gap includes a gap between determining a transmit power for an uplink transmission to the first base station and transmitting the uplink transmission to the first base station. In some cases, the second uplink timing gap includes a gap between determining a transmit power for an uplink transmission to the second base station and transmitting the uplink transmission to the second base station.

Figure 9:
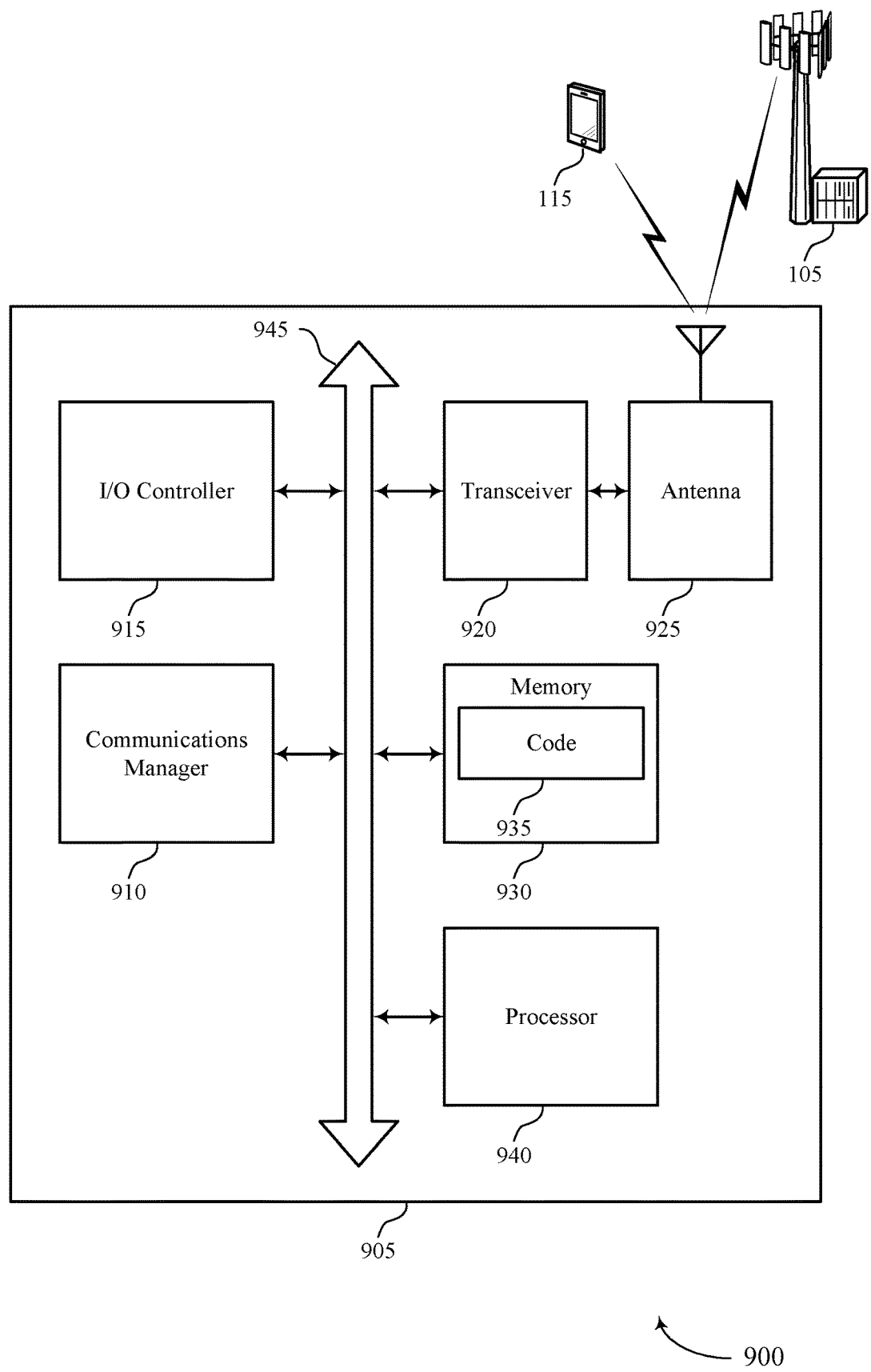
FIG. 9 shows a diagram of a system including a device that supports uplink power control for dual connectivity in accordance with aspects of the present disclosure.

FIG. 9 shows a diagram of a system 900 including a device 905 that supports uplink power control for dual connectivity in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may establish communications with a first base station and a second base station in accordance with a dual connectivity configuration, determine a second uplink timing gap for communications with the second base station, determine, based on being in the dual connectivity configuration, a first uplink timing gap for communications with the first base station, where the first uplink timing gap is determined to be greater than the second uplink timing gap, and communicate with the first base station based on the first uplink timing gap.

In some cases, the communications manager 910 may establish communications with a first base station and a second base station in accordance with a dual connectivity configuration, determine a first uplink timing gap for communications with the first base station, where the first uplink timing gap is based on the UE being in the dual connectivity configuration and is larger than a second uplink timing gap for communications with the second base station, assign a first priority to transmit power determinations for uplink communications with the first base station, where the first priority is higher than a second priority associated with transmit power determinations for uplink communications with the second base station, and communicate with the first base station based on the first uplink timing gap and the first priority and with the second base station based on the second uplink timing gap and the second priority.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting uplink power control for dual connectivity).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
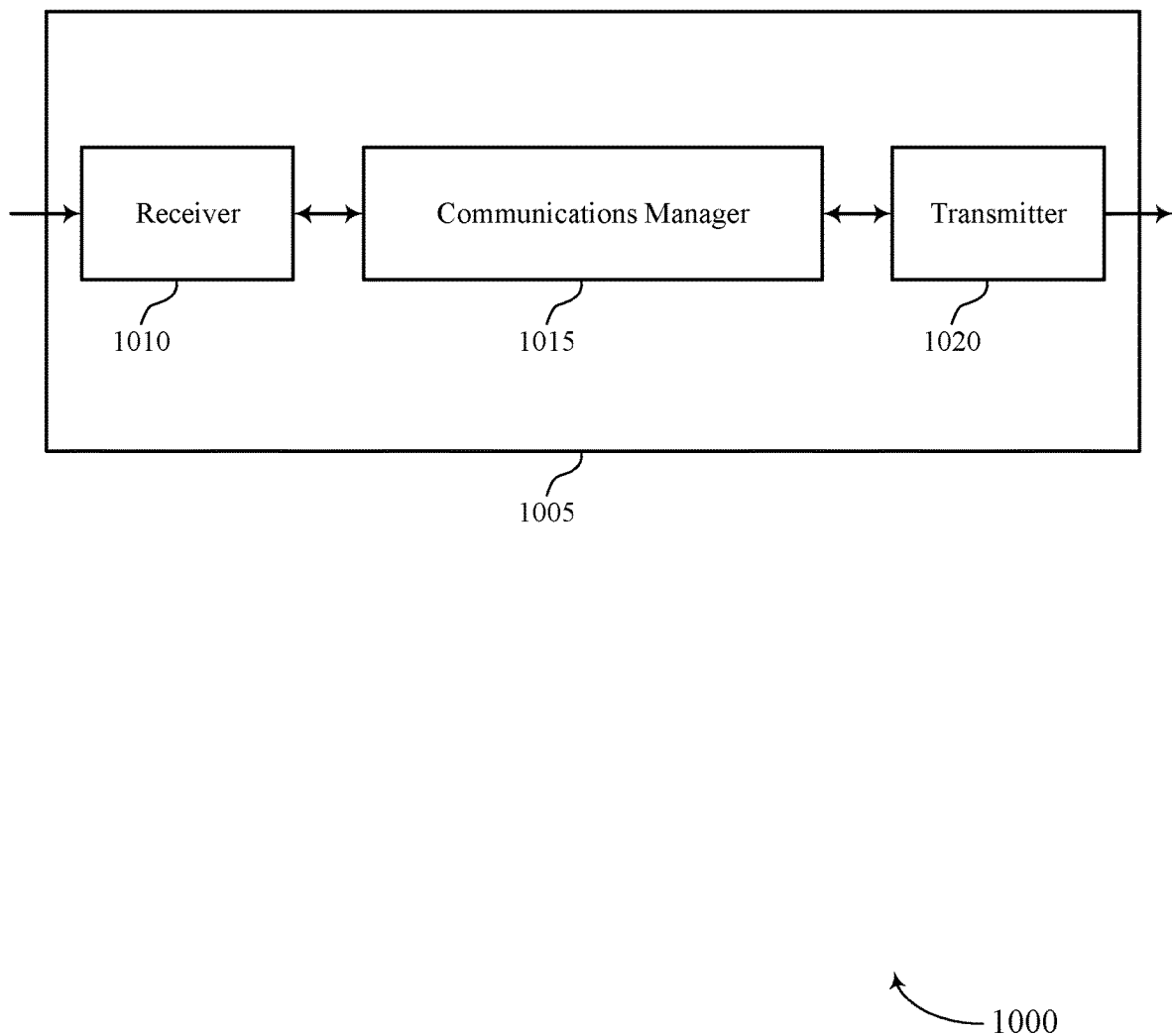
FIGS. 10 and 11 show block diagrams of devices that support uplink power control for dual connectivity in accordance with aspects of the present disclosure.

FIG. 10 shows a block diagram 1000 of a device 1005 that supports uplink power control for dual connectivity in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink power control for dual connectivity, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may establish, at a first base station, communications with a UE that is in a dual connectivity configuration with the first base station and a second base station, identify, based on the UE being in the dual connectivity configuration, a second uplink timing gap for communications between the UE and the second base station, indicate, to the UE, a first uplink timing gap for communications between the UE and the first base station, where the first uplink timing gap is indicated to be greater than the second uplink timing gap, and communicate with the UE based on the first uplink timing gap.

In some cases, the communications manager 1015 may establish communications with a UE that is in a dual connectivity configuration with the first base station and a second base station, identify a second uplink timing gap for communications between the UE and the second base station, determine, based on the UE being in the dual connectivity configuration, a first uplink timing gap for communications between the UE and the first base station that is larger than the second uplink timing gap, and communicate with the UE based on the first uplink timing gap. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
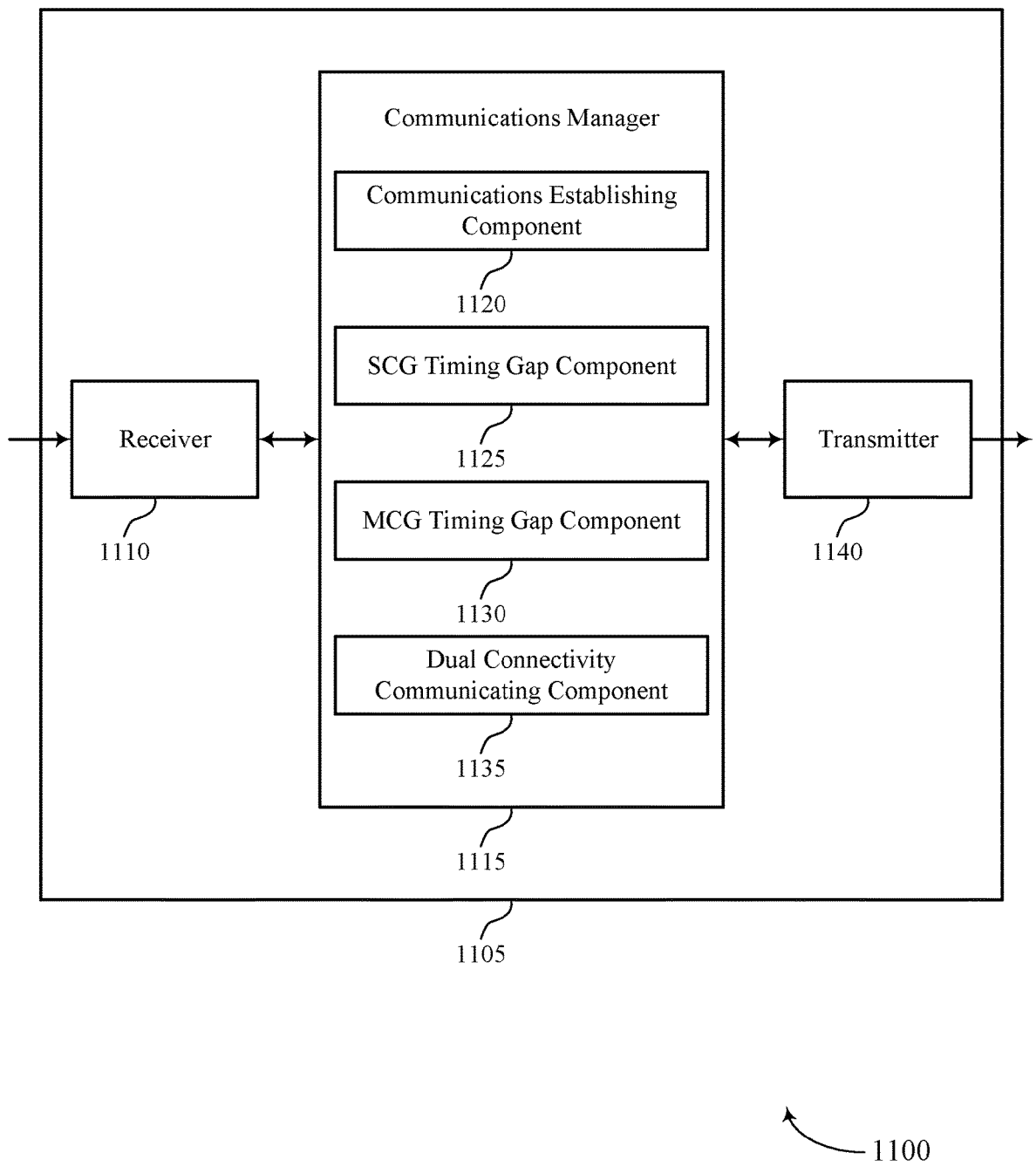

FIG. 11 shows a block diagram 1100 of a device 1105 that supports uplink power control for dual connectivity in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to uplink power control for dual connectivity, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a communications establishing component 1120, a SCG timing gap component 1125, a MCG timing gap component 1130, and a dual connectivity communicating component 1135. The communications manager 1115 may be an example of aspects of the communications manager 1310 described herein.

The communications establishing component 1120 may establish, at a first base station, communications with a UE that is in a dual connectivity configuration with the first base station and a second base station. The SCG timing gap component 1125 may identify, based on the UE being in the dual connectivity configuration, a second uplink timing gap for communications between the UE and the second base station. The MCG timing gap component 1130 may indicate, to the UE, a first uplink timing gap for communications between the UE and the first base station, where the first uplink timing gap is indicated to be greater than the second uplink timing gap. The dual connectivity communicating component 1135 may communicate with the UE based on the first uplink timing gap.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
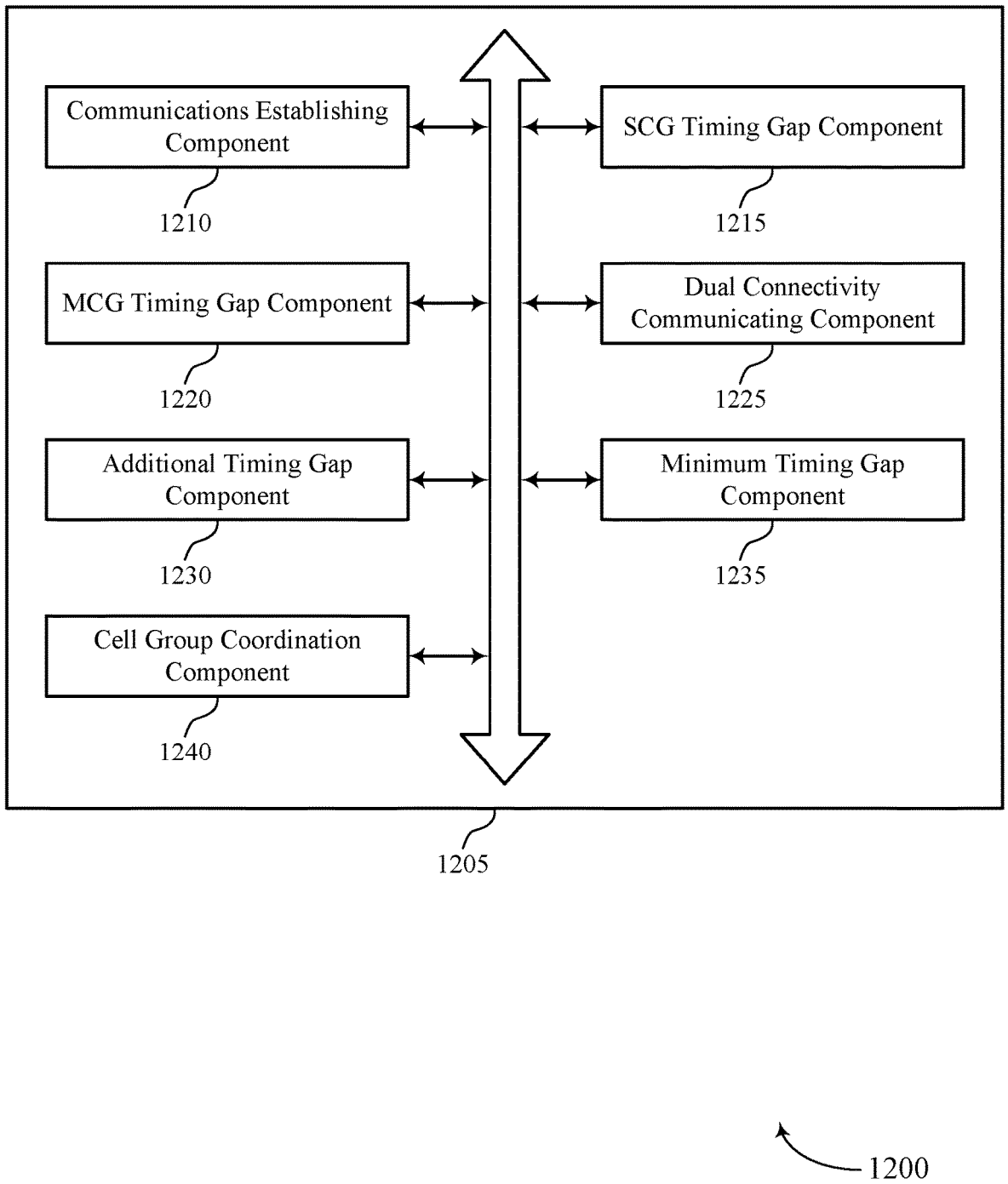
FIG. 12 shows a block diagram of a communications manager that supports uplink power control for dual connectivity in accordance with aspects of the present disclosure.

FIG. 12 shows a block diagram 1200 of a communications manager 1205 that supports uplink power control for dual connectivity in accordance with aspects of the present disclosure. The communications manager 1205 may be an example of aspects of a communications manager 1015, a communications manager 1115, or a communications manager 1310 described herein. The communications manager 1205 may include a communications establishing component 1210, a SCG timing gap component 1215, a MCG timing gap component 1220, a dual connectivity communicating component 1225, an additional timing gap component 1230, a minimum timing gap component 1235, and a cell group coordination component 1240. Each of these modules may communicate, directly or indirectly, with one another (e.g., via one or more buses).

The communications establishing component 1210 may establish, at a first base station, communications with a UE that is in a dual connectivity configuration with the first base station and a second base station. The SCG timing gap component 1215 may identify, based on the UE being in the dual connectivity configuration, a second uplink timing gap for communications between the UE and the second base station. In some examples, the SCG timing gap component 1215 may identify a third uplink timing gap for a second type of communications between the UE and the second base station. In some examples, the SCG timing gap component 1215 may determine the first uplink timing gap to be greater than the third uplink timing gap.

The MCG timing gap component 1220 may indicate, to the UE, a first uplink timing gap for communications between the UE and the first base station, where the first uplink timing gap is indicated to be greater than the second uplink timing gap. In some examples, the MCG timing gap component 1220 may determine a set of uplink timing gaps based on the dual connectivity configuration, where the set of uplink timing gaps is configured to have a smallest entry that is larger than the second uplink timing gap. In some cases, the second uplink timing gap includes a gap between downlink transmissions and corresponding uplink transmissions from the UE to the second base station.

In some examples, the MCG timing gap component 1220 may transmit, to the UE, an indication of the set of uplink timing gaps. In some cases, the first uplink timing gap is larger than an uplink timing gap for communications between the first base station and the UE when the UE is not in the dual connectivity configuration. In some cases, the first uplink timing gap includes a gap between transmitting a downlink transmission to the UE and receiving a corresponding uplink transmission from the UE.

In some examples, the MCG timing gap component 1220 may transmit, to the UE, an indication of the first uplink timing gap, where the indication includes an index for the set of uplink timing gaps. In some examples, the MCG timing gap component 1220 may transmit, to the UE, an indication of the first uplink timing gap via an RRC message.

In some examples, the MCG timing gap component 1220 may determine, based on the UE being in the dual connectivity configuration, a fourth uplink timing gap for the second type of communications between the UE and the first base station, where the fourth uplink timing gap is determined to be greater than the second uplink timing gap and the third uplink timing gap. In some examples, the MCG timing gap component 1220 may indicate, to the UE, the fourth uplink timing gap for the second type of communications between the UE and the first base station.

In some examples, the MCG timing gap component 1220 may determine a second set of uplink timing gaps based on the dual connectivity configuration, where the second set of uplink timing gaps is configured to have a smallest entry that is larger than the third uplink timing gap. In some examples, the MCG timing gap component 1220 may transmit, to the UE, an indication of the second set of uplink timing gaps.

In some examples, the MCG timing gap component 1220 may transmit, to the UE, an indication of the fourth uplink timing gap, where the indication includes an index for the second set of uplink timing gaps. In some examples, the MCG timing gap component 1220 may transmit, to the UE, an indication of the fourth uplink timing gap via an RRC message.

In some cases, the first uplink timing gap includes a gap between transmitting a downlink transmission to the UE and receiving a corresponding uplink transmission from the UE. In some cases, the second uplink timing gap includes a gap between transmit power determinations and corresponding uplink transmissions from the UE to the second base station.

In some cases, the dual connectivity configuration includes a set of component carriers for the second base station associated with a corresponding set of uplink timing gaps, and where the second uplink timing gap is a largest one of the corresponding set of uplink timing gaps. In some cases, the corresponding set of uplink timing gaps are for uplink control channel transmissions. In some cases, the set of component carriers are associated with a second corresponding set of uplink timing gaps for uplink shared channel transmissions. In some cases, the second uplink timing gap is a largest one of the corresponding set of uplink timing gaps and the second corresponding set of uplink timing gaps.

In some cases, a third uplink timing gap includes a gap between transmit power determinations and corresponding uplink transmissions from the UE to the second base station, and where the first uplink timing gap is based on a combination of the second uplink timing gap and the third uplink timing gap. In some cases, the first uplink timing gap includes a gap between determining a transmit power for an uplink transmission to the first base station and transmitting the uplink transmission to the first base station. In some cases, the second uplink timing gap includes a gap between determining a transmit power for an uplink transmission to the second base station and transmitting the uplink transmission to the second base station.

The dual connectivity communicating component 1225 may communicate with the UE based on the first uplink timing gap. In some examples, the dual connectivity communicating component 1225 may transmit a downlink shared channel message to the UE in a first slot.

In some examples, the dual connectivity communicating component 1225 may receive a feedback message for the downlink shared channel message from the UE in a second slot, where the first slot and the second slot are separated by the first uplink timing gap. In some examples, the dual connectivity communicating component 1225 may transmit a downlink control channel message to the UE in a first slot, where the downlink control channel message schedules an uplink shared channel message for the UE.

In some examples, the dual connectivity communicating component 1225 may receive the uplink shared channel message from the UE in a second slot, where the first slot and the second slot are separated by the fourth uplink timing gap. In some cases, the first type of communications includes uplink control channel transmissions, and the second type of communications includes uplink shared channel transmissions. The dual connectivity communicating component 1225 may transmit, to the UE, an indication of a first priority for transmit power determinations for uplink communications with the first base station, where the first priority is higher than a second priority associated with transmit power determinations for uplink communications with the second base station.

The additional timing gap component 1230 may transmit, to the UE, an indication of a default uplink timing gap for communications between the UE and the first base station. In some examples, the additional timing gap component 1230 may transmit, to the UE, an indication of an additional uplink timing gap for communications between the UE and the first base station when in the dual connectivity configuration.

In some examples, the additional timing gap component 1230 may determine the first uplink timing gap based on a combination of the default uplink timing gap and the additional uplink timing gap. In some examples, the additional timing gap component 1230 may transmit, to the UE, an indication of a set of uplink timing gaps for communications between the UE and the first base station, where the indication of the default uplink timing gap includes an index for the set of uplink timing gaps.

In some examples, the additional timing gap component 1230 may identify a SCS for communications between the UE and the first base station. In some examples, the additional timing gap component 1230 may determine the additional uplink timing gap based on the SCS. In some examples, the additional timing gap component 1230 may transmit, to the UE, an indication of a default uplink timing gap for the second type of communications between the UE and the first base station.

In some examples, the additional timing gap component 1230 may transmit, to the UE, an indication of an additional uplink timing gap for the second type of communications between the UE and the first base station when in the dual connectivity configuration. In some examples, the additional timing gap component 1230 may determine the fourth uplink timing gap based on a combination of the default uplink timing gap for the second type of communications and the additional uplink timing gap for the second type of communications.

In some examples, the additional timing gap component 1230 may identify a SCS for communications with the UE. In some examples, the additional timing gap component 1230 may determine the additional uplink timing gap for the second type of communications based on the SCS. In some cases, the additional uplink timing gap is specific to the UE.

In some cases, the indication of the default uplink timing gap is transmitted based on a PUSCH configuration. In some cases, the PUSCH configuration includes a time domain allocation list for the second type of communications, and where the time domain allocation list includes the default uplink timing gap.

The minimum timing gap component 1235 may transmit an indication of a minimum uplink timing gap for communications between the UE and the first base station when in the dual connectivity configuration, where the minimum uplink timing gap is configured to be greater than the second uplink timing gap. In some examples, the minimum timing gap component 1235 may receive an indication of a UE capability from the UE. In some examples, the minimum timing gap component 1235 may determine the minimum uplink timing gap based on the UE capability.

In some examples, the minimum timing gap component 1235 may transmit an indication of a minimum uplink timing gap for the second type of communications between the UE and the first base station, where the minimum uplink timing gap for the second type of communications is configured to be greater than the third uplink timing gap. In some examples, the minimum timing gap component 1235 may determine the minimum uplink timing gap for the second type of communications based on the UE capability.

The cell group coordination component 1240 may communicate with the second base station over a backhaul link. In some examples, the cell group coordination component 1240 may receive an indication of the second uplink timing gap based on the communicating with the second base station. In some examples, the cell group coordination component 1240 may negotiate the first uplink timing gap with the second base station based on the second uplink timing gap. In some examples, the cell group coordination component 1240 may receive an indication of the third uplink timing gap based on the communicating with the second base station. In some examples, the cell group coordination component 1240 may negotiate the fourth uplink timing gap with the second base station based on the third uplink timing gap.

Figure 13:
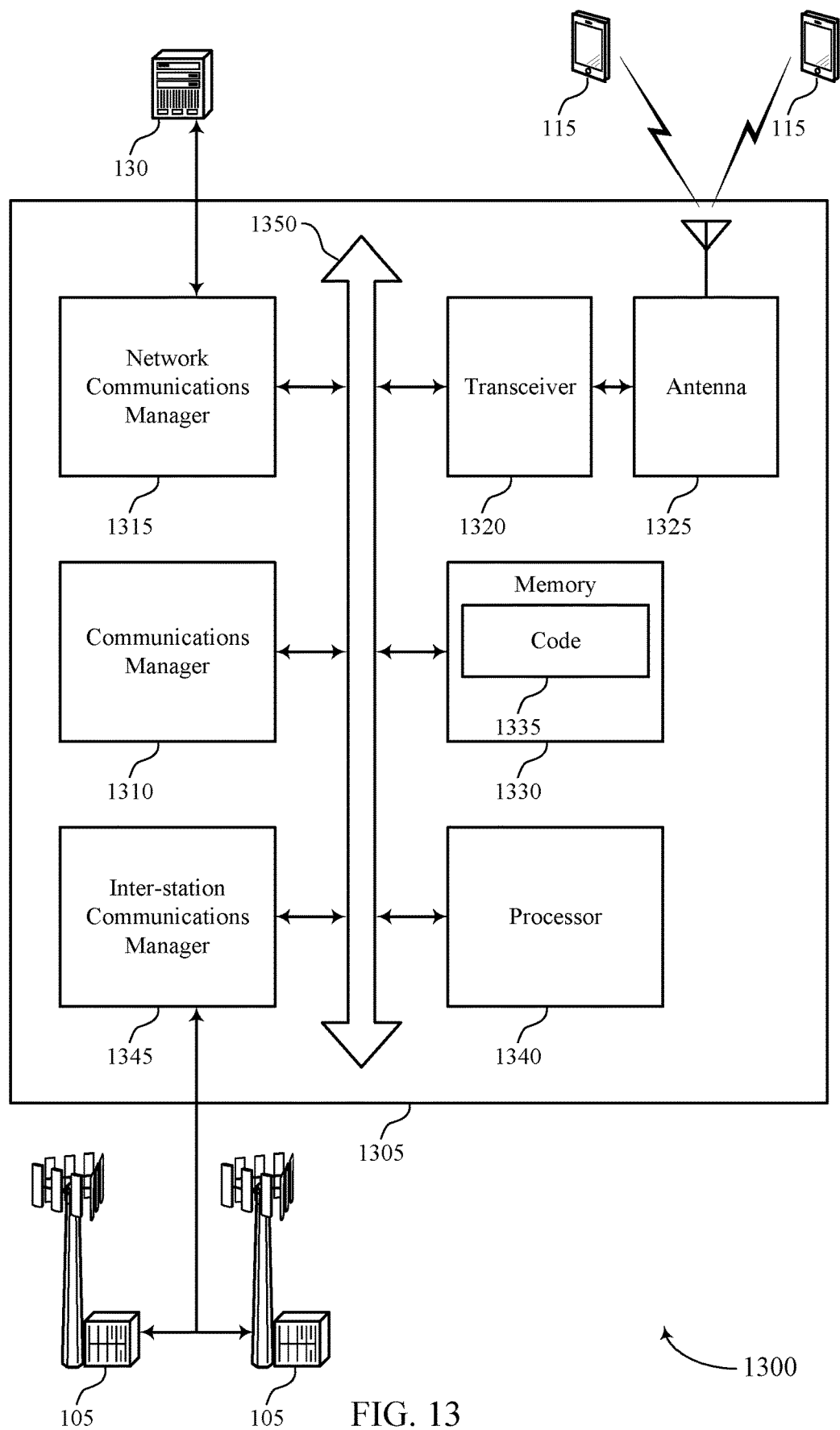
FIG. 13 shows a diagram of a system including a device that supports uplink power control for dual connectivity in accordance with aspects of the present disclosure.

FIG. 13 shows a diagram of a system 1300 including a device 1305 that supports uplink power control for dual connectivity in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may establish, at a first base station, communications with a UE that is in a dual connectivity configuration with the first base station and a second base station, identify, based on the UE being in the dual connectivity configuration, a second uplink timing gap for communications between the UE and the second base station, indicate, to the UE, a first uplink timing gap for communications between the UE and the first base station, where the first uplink timing gap is indicated to be greater than the second uplink timing gap, and communicate with the UE based on the first uplink timing gap. In some cases, the communications manager 1310 may establish communications with a UE that is in a dual connectivity configuration with the first base station and a second base station, identify a second uplink timing gap for communications between the UE and the second base station, determine, based on the UE being in the dual connectivity configuration, a first uplink timing gap for communications between the UE and the first base station that is larger than the second uplink timing gap, and communicate with the UE based on the first uplink timing gap.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting uplink power control for dual connectivity).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
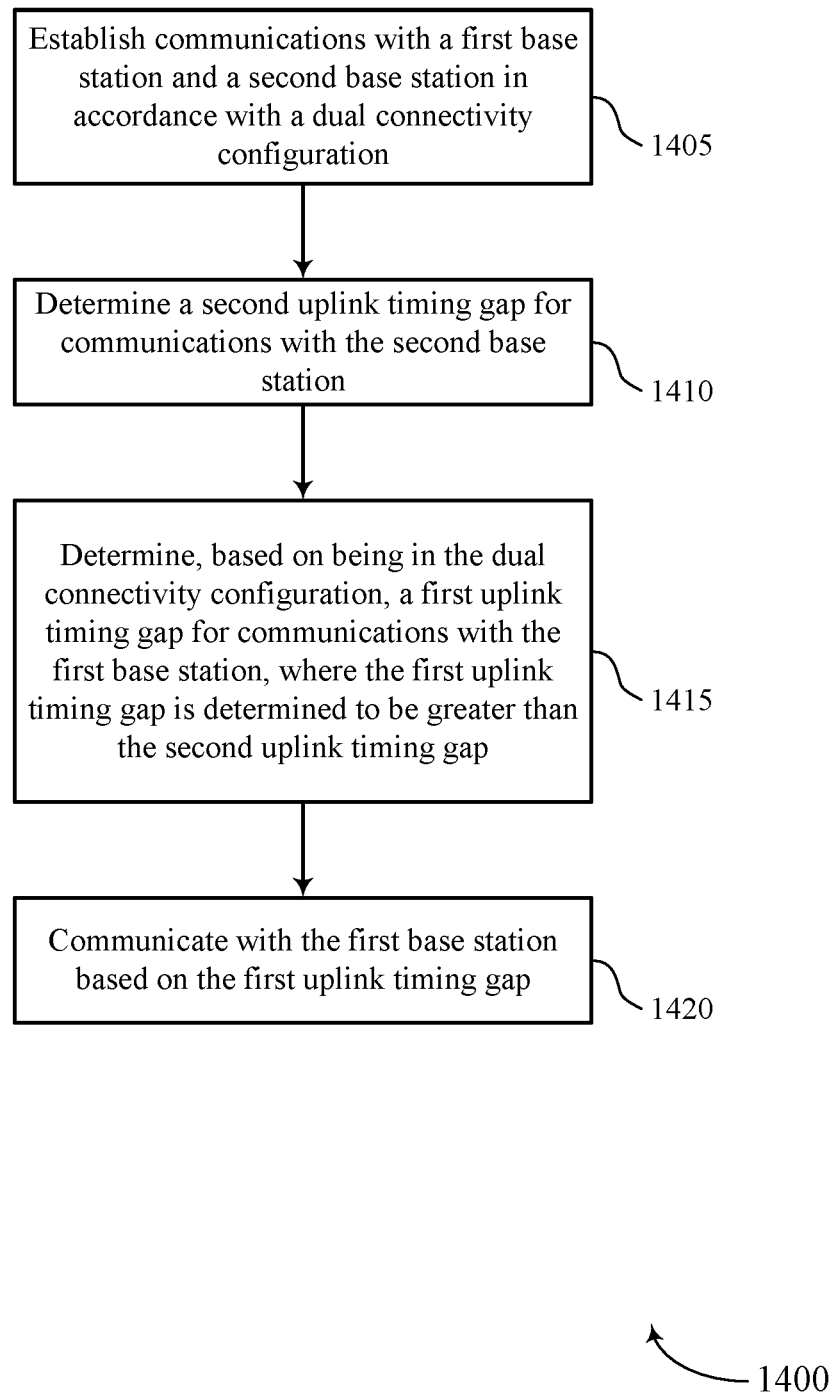
FIGS. 14 through 21 show flowcharts illustrating methods that support uplink power control for dual connectivity in accordance with aspects of the present disclosure.

FIG. 14 shows a flowchart illustrating a method 1400 that supports uplink power control for dual connectivity in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may establish communications with a first base station and a second base station in accordance with a dual connectivity configuration. The operations of 1405 may be performed according to the methods described herein. In some examples, aspects of the operations of 1405 may be performed by a communications establishing component as described with reference to FIGS. 6 through 9.

At 1410, the UE may determine a second uplink timing gap for communications with the second base station. The operations of 1410 may be performed according to the methods described herein. In some examples, aspects of the operations of 1410 may be performed by a SCG timing gap component as described with reference to FIGS. 6 through 9.

At 1415, the UE may determine, based on being in the dual connectivity configuration, a first uplink timing gap for communications with the first base station, where the first uplink timing gap is determined to be greater than the second uplink timing gap. The operations of 1415 may be performed according to the methods described herein. In some examples, aspects of the operations of 1415 may be performed by a MCG timing gap component as described with reference to FIGS. 6 through 9.

At 1420, the UE may communicate with the first base station based on the first uplink timing gap. The operations of 1420 may be performed according to the methods described herein. In some examples, aspects of the operations of 1420 may be performed by a dual connectivity communicating component as described with reference to FIGS. 6 through 9.

Figure 15:
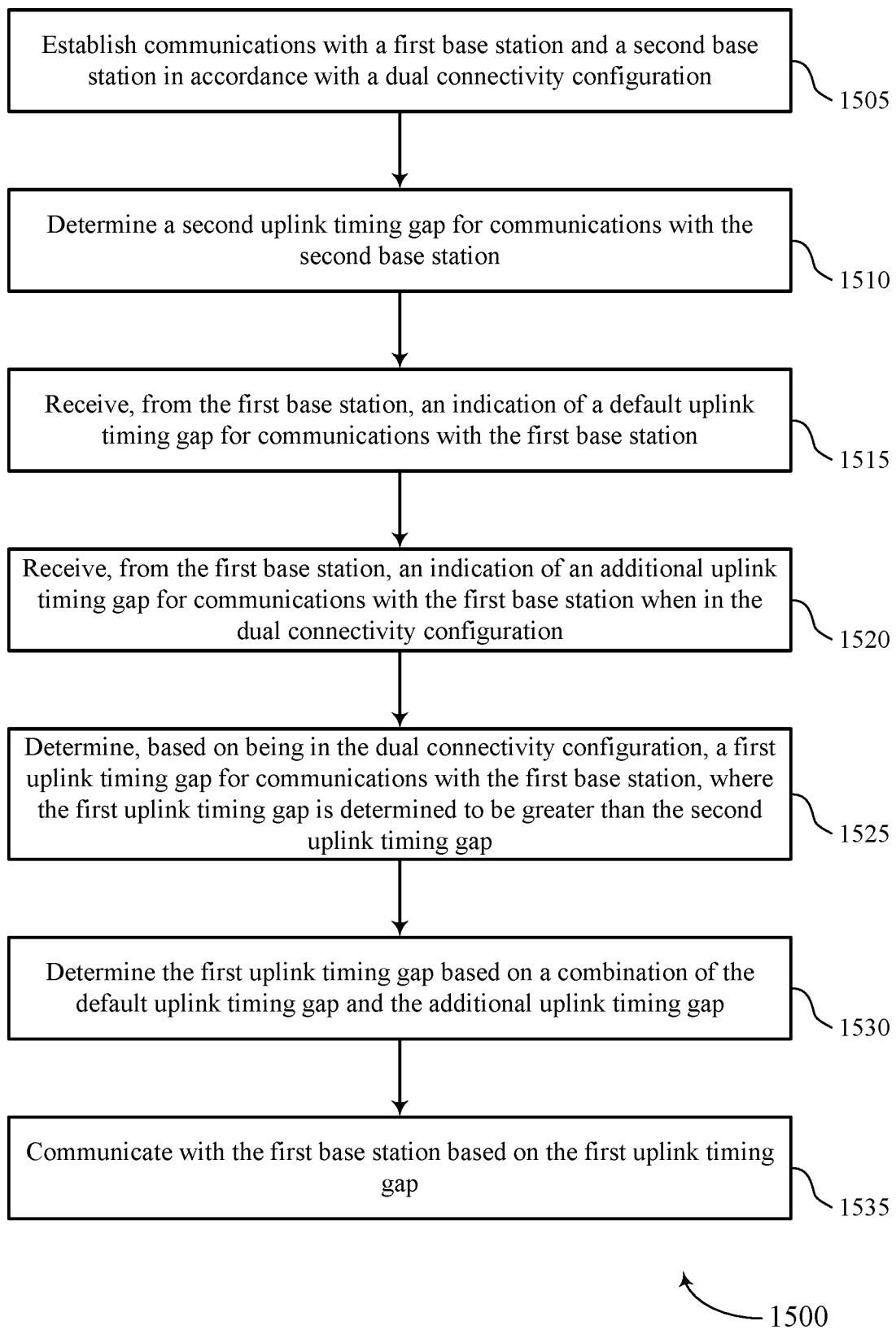

FIG. 15 shows a flowchart illustrating a method 1500 that supports uplink power control for dual connectivity in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may establish communications with a first base station and a second base station in accordance with a dual connectivity configuration. The operations of 1505 may be performed according to the methods described herein. In some examples, aspects of the operations of 1505 may be performed by a communications establishing component as described with reference to FIGS. 6 through 9.

At 1510, the UE may determine a second uplink timing gap for communications with the second base station. The operations of 1510 may be performed according to the methods described herein. In some examples, aspects of the operations of 1510 may be performed by a SCG timing gap component as described with reference to FIGS. 6 through 9.

At 1515, the UE may receive, from the first base station, an indication of a default uplink timing gap for communications with the first base station. The operations of 1515 may be performed according to the methods described herein. In some examples, aspects of the operations of 1515 may be performed by an additional timing gap component as described with reference to FIGS. 6 through 9.

At 1520, the UE may receive, from the first base station, an indication of an additional uplink timing gap for communications with the first base station when in the dual connectivity configuration. The operations of 1520 may be performed according to the methods described herein. In some examples, aspects of the operations of 1520 may be performed by an additional timing gap component as described with reference to FIGS. 6 through 9.

At 1525, the UE may determine, based on being in the dual connectivity configuration, a first uplink timing gap for communications with the first base station, where the first uplink timing gap is determined to be greater than the second uplink timing gap. The operations of 1525 may be performed according to the methods described herein. In some examples, aspects of the operations of 1525 may be performed by a MCG timing gap component as described with reference to FIGS. 6 through 9.

At 1530, the UE may determine the first uplink timing gap based on a combination of the default uplink timing gap and the additional uplink timing gap. The operations of 1530 may be performed according to the methods described herein. In some examples, aspects of the operations of 1530 may be performed by an additional timing gap component as described with reference to FIGS. 6 through 9.

At 1535, the UE may communicate with the first base station based on the first uplink timing gap. The operations of 1535 may be performed according to the methods described herein. In some examples, aspects of the operations of 1535 may be performed by a dual connectivity communicating component as described with reference to FIGS. 6 through 9.

Figure 16:
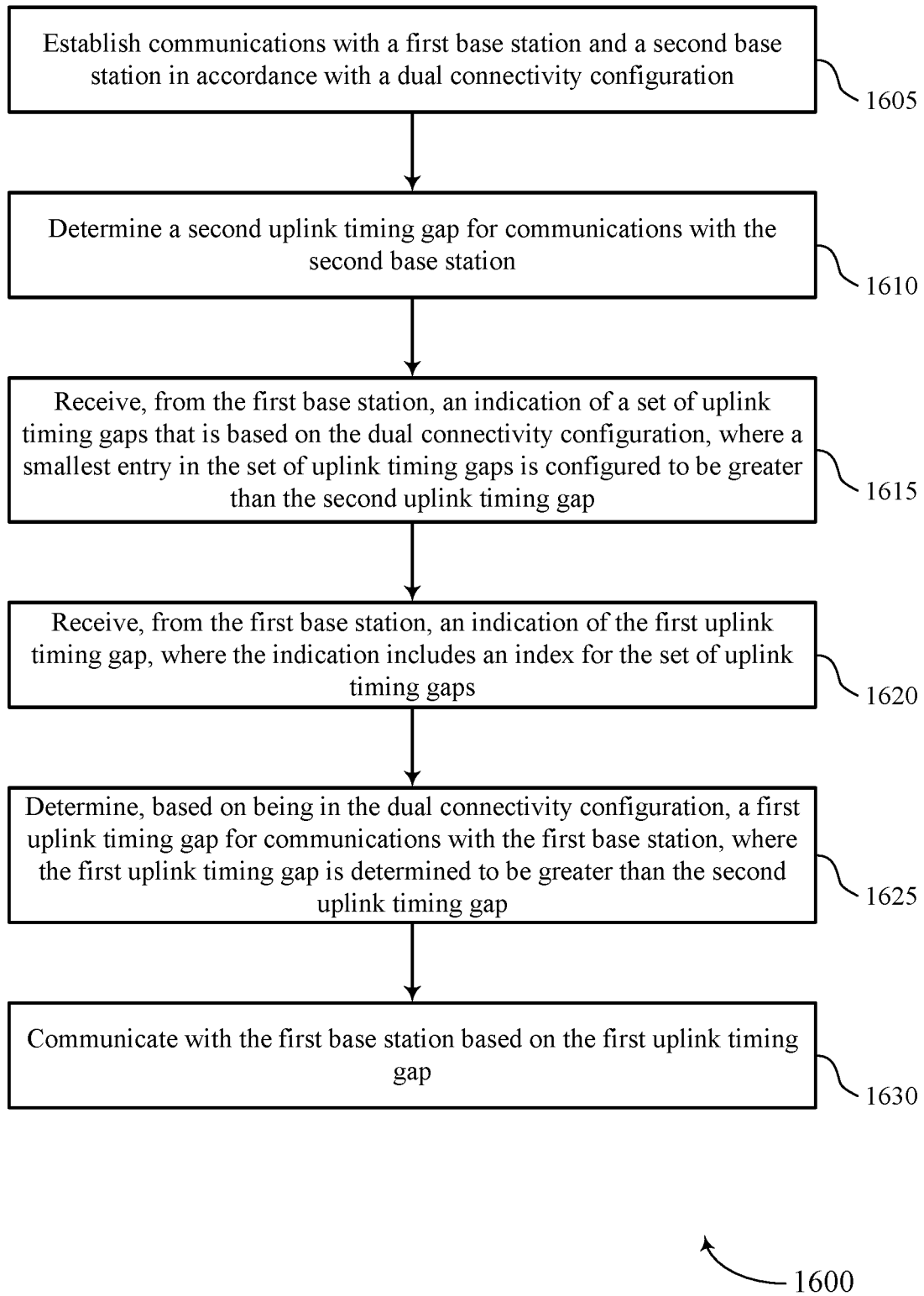

FIG. 16 shows a flowchart illustrating a method 1600 that supports uplink power control for dual connectivity in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may establish communications with a first base station and a second base station in accordance with a dual connectivity configuration. The operations of 1605 may be performed according to the methods described herein. In some examples, aspects of the operations of 1605 may be performed by a communications establishing component as described with reference to FIGS. 6 through 9.

At 1610, the UE may determine a second uplink timing gap for communications with the second base station. The operations of 1610 may be performed according to the methods described herein. In some examples, aspects of the operations of 1610 may be performed by a SCG timing gap component as described with reference to FIGS. 6 through 9.

At 1615, the UE may receive, from the first base station, an indication of a set of uplink timing gaps that is based on the dual connectivity configuration, where a smallest entry in the set of uplink timing gaps is configured to be larger than the second uplink timing gap. The operations of 1615 may be performed according to the methods described herein. In some examples, aspects of the operations of 1615 may be performed by a MCG timing gap component as described with reference to FIGS. 6 through 9.

At 1620, the UE may receive, from the first base station, an indication of the first uplink timing gap, where the indication includes an index for the set of uplink timing gaps. The operations of 1620 may be performed according to the methods described herein. In some examples, aspects of the operations of 1620 may be performed by a MCG timing gap component as described with reference to FIGS. 6 through 9.

At 1625, the UE may determine, based on being in the dual connectivity configuration, a first uplink timing gap for communications with the first base station, where the first uplink timing gap is determined to be greater than the second uplink timing gap. The operations of 1625 may be performed according to the methods described herein. In some examples, aspects of the operations of 1625 may be performed by a MCG timing gap component as described with reference to FIGS. 6 through 9.

At 1630, the UE may communicate with the first base station based on the first uplink timing gap. The operations of 1630 may be performed according to the methods described herein. In some examples, aspects of the operations of 1630 may be performed by a dual connectivity communicating component as described with reference to FIGS. 6 through 9.

Figure 17:
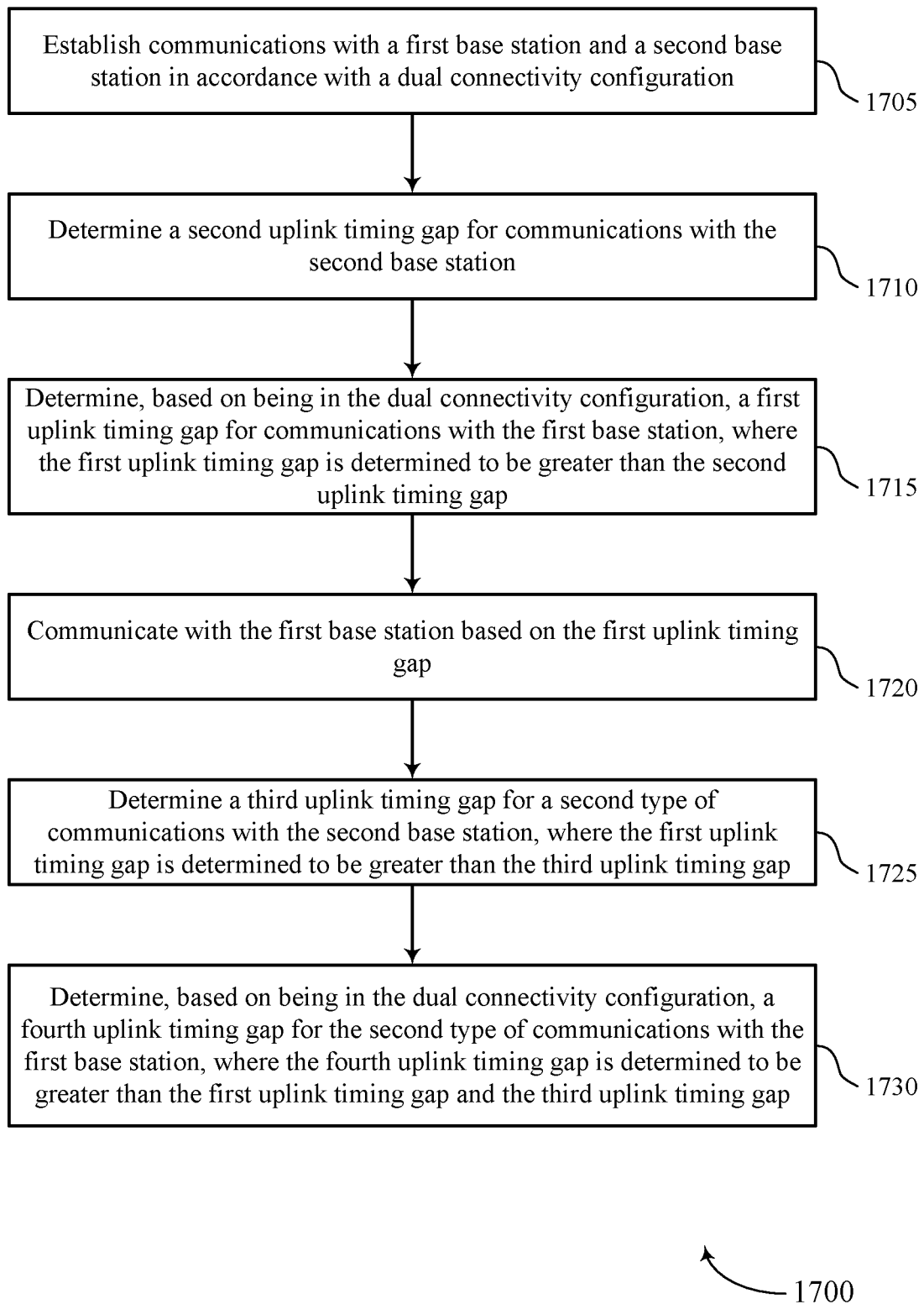

FIG. 17 shows a flowchart illustrating a method 1700 that supports uplink power control for dual connectivity in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may establish communications with a first base station and a second base station in accordance with a dual connectivity configuration. The operations of 1705 may be performed according to the methods described herein. In some examples, aspects of the operations of 1705 may be performed by a communications establishing component as described with reference to FIGS. 6 through 9.

At 1710, the UE may determine a second uplink timing gap for communications with the second base station. The operations of 1710 may be performed according to the methods described herein. In some examples, aspects of the operations of 1710 may be performed by a SCG timing gap component as described with reference to FIGS. 6 through 9.

At 1715, the UE may determine, based on being in the dual connectivity configuration, a first uplink timing gap for communications with the first base station, where the first uplink timing gap is determined to be greater than the second uplink timing gap. The operations of 1715 may be performed according to the methods described herein. In some examples, aspects of the operations of 1715 may be performed by a MCG timing gap component as described with reference to FIGS. 6 through 9.

At 1720, the UE may communicate with the first base station based on the first uplink timing gap. The operations of 1720 may be performed according to the methods described herein. In some examples, aspects of the operations of 1720 may be performed by a dual connectivity communicating component as described with reference to FIGS. 6 through 9.

At 1725, the UE may determine a third uplink timing gap for a second type of communications with the second base station, where the first uplink timing gap is determined to be greater than the third uplink timing gap. The operations of 1725 may be performed according to the methods described herein. In some examples, aspects of the operations of 1725 may be performed by a SCG timing gap component as described with reference to FIGS. 6 through 9.

At 1730, the UE may determine, based on being in the dual connectivity configuration, a fourth uplink timing gap for the second type of communications with the first base station, where the fourth uplink timing gap is determined to be greater than the first uplink timing gap and the third uplink timing gap. The operations of 1730 may be performed according to the methods described herein. In some examples, aspects of the operations of 1730 may be performed by a MCG timing gap component as described with reference to FIGS. 6 through 9.

Figure 18:
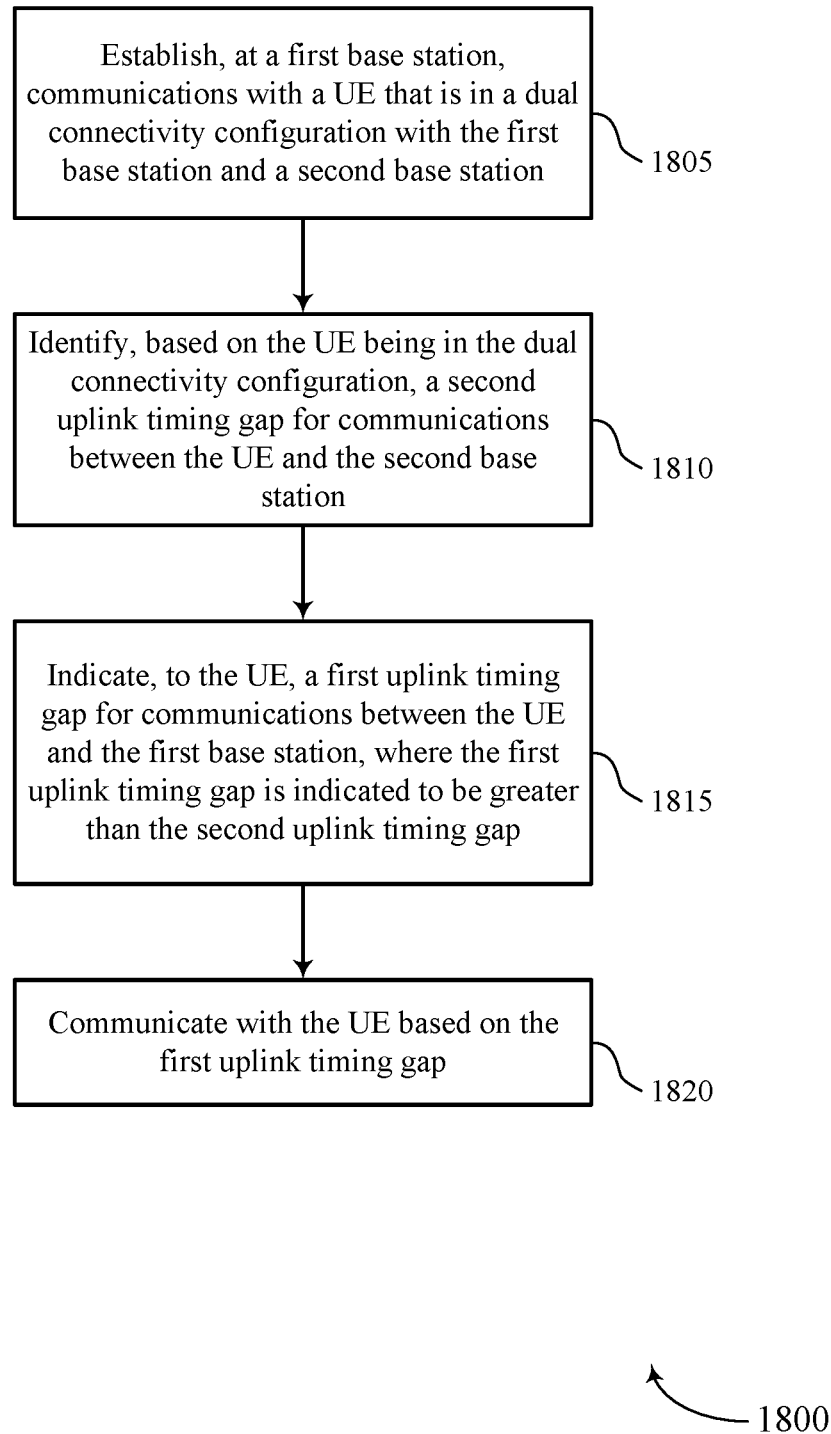

FIG. 18 shows a flowchart illustrating a method 1800 that supports uplink power control for dual connectivity in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may establish, at a first base station, communications with a UE that is in a dual connectivity configuration with the first base station and a second base station. The operations of 1805 may be performed according to the methods described herein. In some examples, aspects of the operations of 1805 may be performed by a communications establishing component as described with reference to FIGS. 10 through 13.

At 1810, the base station may identify, based on the UE being in the dual connectivity configuration, a second uplink timing gap for communications between the UE and the second base station. The operations of 1810 may be performed according to the methods described herein. In some examples, aspects of the operations of 1810 may be performed by a SCG timing gap component as described with reference to FIGS. 10 through 13.

At 1815, the base station may indicate, to the UE, a first uplink timing gap for communications between the UE and the first base station, where the first uplink timing gap is indicated to be greater than the second uplink timing gap. The operations of 1815 may be performed according to the methods described herein. In some examples, aspects of the operations of 1815 may be performed by a MCG timing gap component as described with reference to FIGS. 10 through 13.

At 1820, the base station may communicate with the UE based on the first uplink timing gap. The operations of 1820 may be performed according to the methods described herein. In some examples, aspects of the operations of 1820 may be performed by a dual connectivity communicating component as described with reference to FIGS. 10 through 13.

Figure 19:
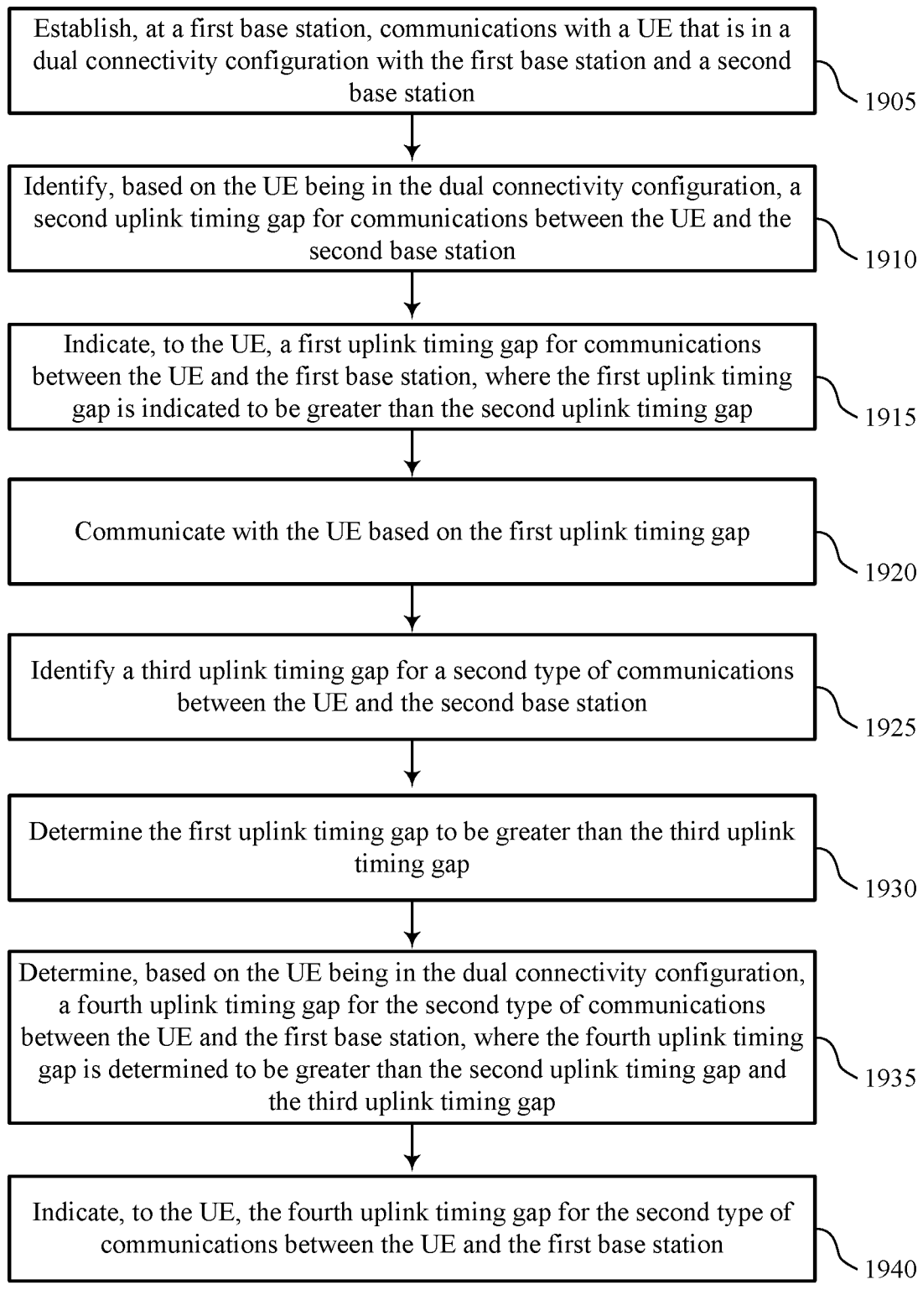

FIG. 19 shows a flowchart illustrating a method 1900 that supports uplink power control for dual connectivity in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may establish, at a first base station, communications with a UE that is in a dual connectivity configuration with the first base station and a second base station. The operations of 1905 may be performed according to the methods described herein. In some examples, aspects of the operations of 1905 may be performed by a communications establishing component as described with reference to FIGS. 10 through 13.

At 1910, the base station may identify, based on the UE being in the dual connectivity configuration, a second uplink timing gap for communications between the UE and the second base station. The operations of 1910 may be performed according to the methods described herein. In some examples, aspects of the operations of 1910 may be performed by a SCG timing gap component as described with reference to FIGS. 10 through 13.

At 1915, the base station may indicate, to the UE, a first uplink timing gap for communications between the UE and the first base station, where the first uplink timing gap is indicated to be greater than the second uplink timing gap. The operations of 1915 may be performed according to the methods described herein. In some examples, aspects of the operations of 1915 may be performed by a MCG timing gap component as described with reference to FIGS. 10 through 13.

At 1920, the base station may communicate with the UE based on the first uplink timing gap. The operations of 1920 may be performed according to the methods described herein. In some examples, aspects of the operations of 1920 may be performed by a dual connectivity communicating component as described with reference to FIGS. 10 through 13.

At 1925, the base station may identify a third uplink timing gap for a second type of communications between the UE and the second base station. The operations of 1925 may be performed according to the methods described herein. In some examples, aspects of the operations of 1925 may be performed by a SCG timing gap component as described with reference to FIGS. 10 through 13.

At 1930, the base station may determine the first uplink timing gap to be greater than the third uplink timing gap. The operations of 1930 may be performed according to the methods described herein. In some examples, aspects of the operations of 1930 may be performed by a SCG timing gap component as described with reference to FIGS. 10 through 13.

At 1935, the base station may determine, based on the UE being in the dual connectivity configuration, a fourth uplink timing gap for the second type of communications between the UE and the first base station, where the fourth uplink timing gap is determined to be greater than the second uplink timing gap and the third uplink timing gap. The operations of 1935 may be performed according to the methods described herein. In some examples, aspects of the operations of 1935 may be performed by a MCG timing gap component as described with reference to FIGS. 10 through 13.

At 1940, the base station may indicate, to the UE, the fourth uplink timing gap for the second type of communications between the UE and the first base station. The operations of 1940 may be performed according to the methods described herein. In some examples, aspects of the operations of 1940 may be performed by a MCG timing gap component as described with reference to FIGS. 10 through 13.

Figure 20:
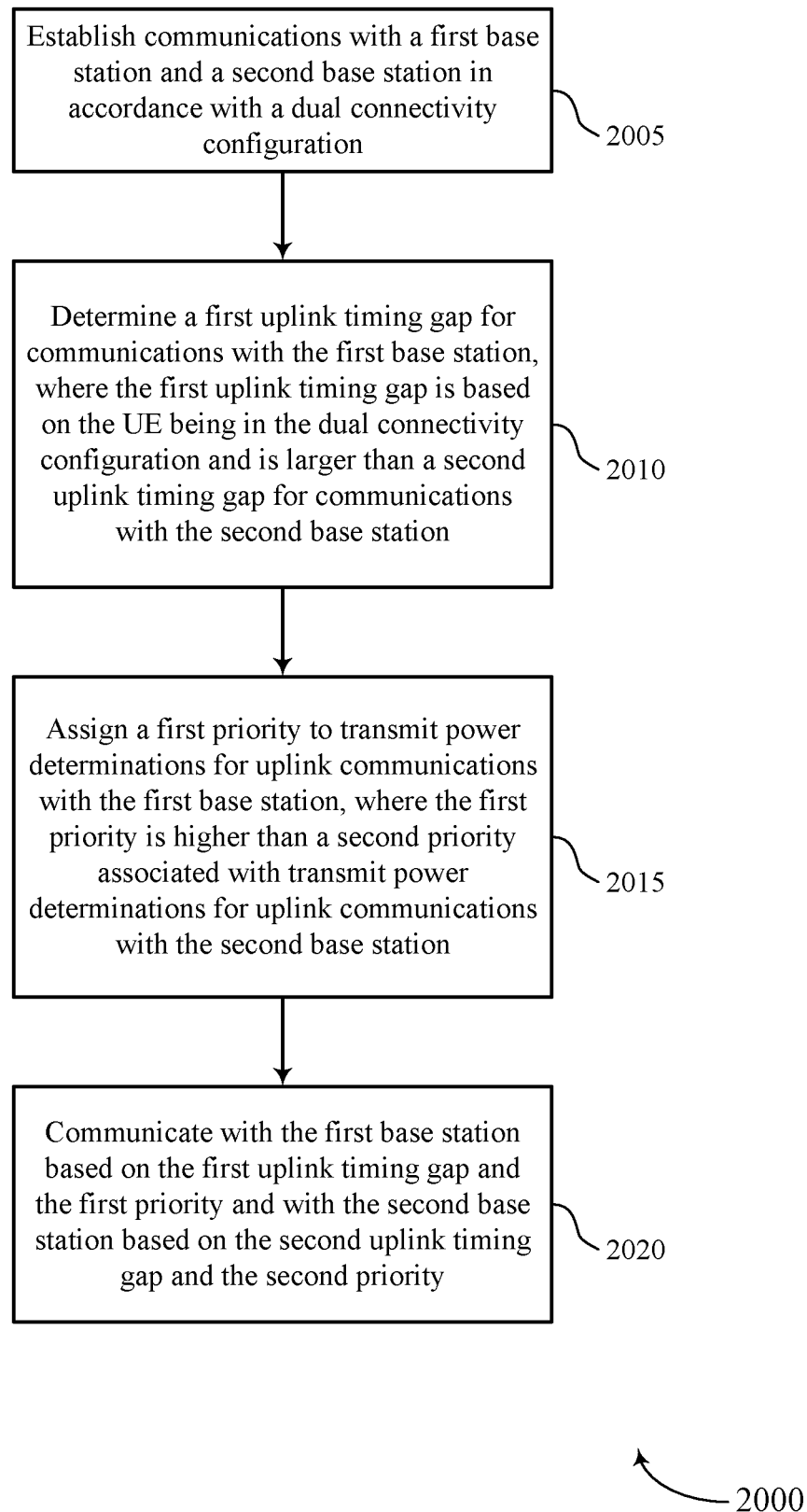

FIG. 20 shows a flowchart illustrating a method 2000 that supports uplink power control schemes for dual connectivity in accordance with aspects of the present disclosure. The operations of method 2000 may be implemented by a UE 115 or its components as described herein. For example, the operations of method 2000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 2005, the UE may establish communications with a first base station and a second base station in accordance with a dual connectivity configuration. The operations of 2005 may be performed according to the methods described herein. In some examples, aspects of the operations of 2005 may be performed by a communications establishing component as described with reference to FIGS. 6 through 9.

At 2010, the UE may determine a first uplink timing gap for communications with the first base station, where the first uplink timing gap is based on the UE being in the dual connectivity configuration and is larger than a second uplink timing gap for communications with the second base station. The operations of 2010 may be performed according to the methods described herein. In some examples, aspects of the operations of 2010 may be performed by an MCG timing gap component as described with reference to FIGS. 6 through 9.

At 2015, the UE may assign a first priority to transmit power determinations for uplink communications with the first base station, where the first priority is higher than a second priority associated with transmit power determinations for uplink communications with the second base station. The operations of 2015 may be performed according to the methods described herein. In some examples, aspects of the operations of 2015 may be performed by a dual connectivity communicating component as described with reference to FIGS. 6 through 9.

At 2020, the UE may communicate with the first base station based on the first uplink timing gap and the first priority and with the second base station based on the second uplink timing gap and the second priority. The operations of 2020 may be performed according to the methods described herein. In some examples, aspects of the operations of 2020 may be performed by a dual connectivity communicating component as described with reference to FIGS. 6 through 9.

Figure 21:
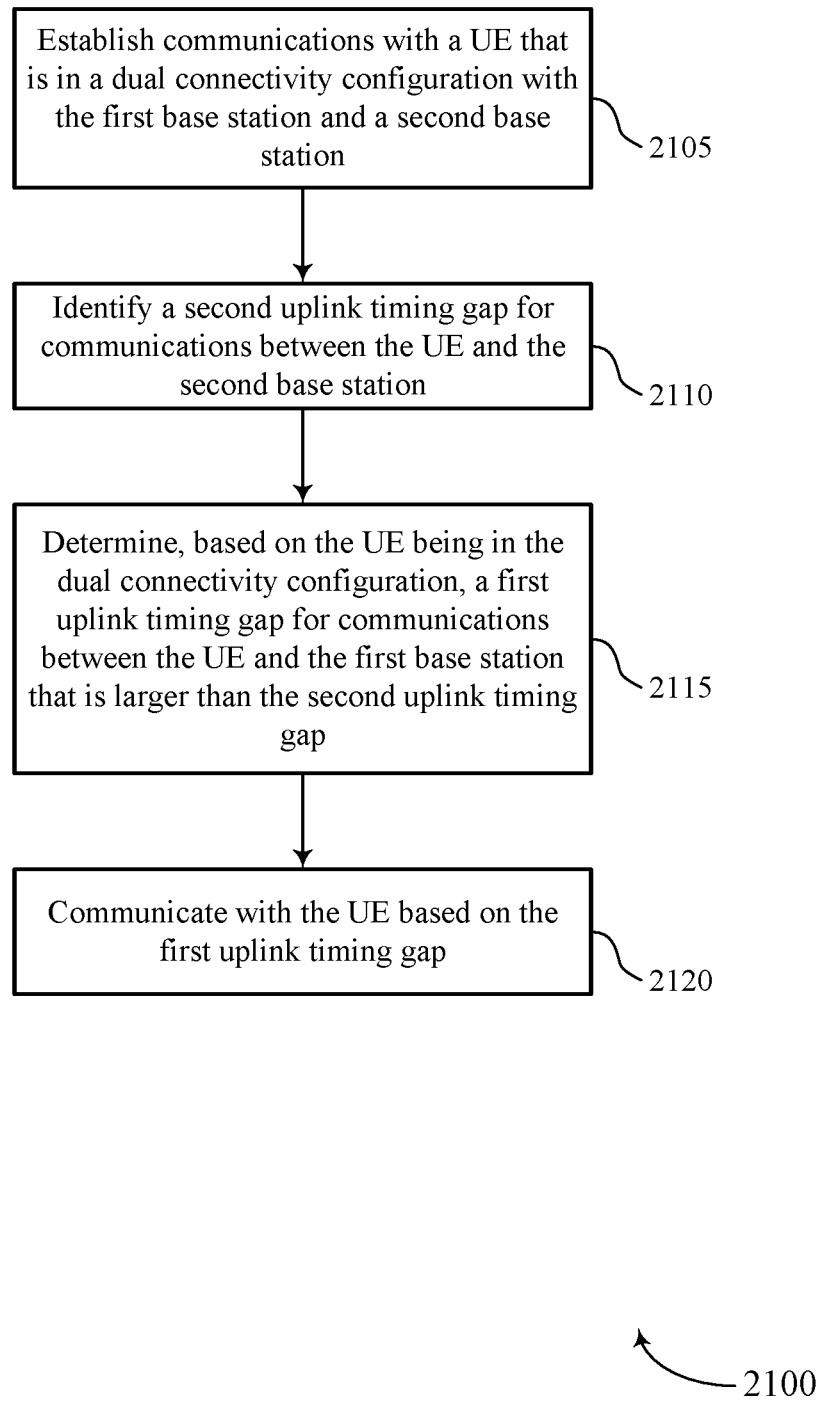

FIG. 21 shows a flowchart illustrating a method 2100 that supports uplink power control schemes for dual connectivity in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2105, the base station may establish communications with a UE that is in a dual connectivity configuration with the first base station and a second base station. The operations of 2105 may be performed according to the methods described herein. In some examples, aspects of the operations of 2105 may be performed by a communications establishing component as described with reference to FIGS. 10 through 13.

At 2110, the base station may identify a second uplink timing gap for communications between the UE and the second base station. The operations of 2110 may be performed according to the methods described herein. In some examples, aspects of the operations of 2110 may be performed by an SCG timing gap component as described with reference to FIGS. 10 through 13.

At 2115, the base station may determine, based on the UE being in the dual connectivity configuration, a first uplink timing gap for communications between the UE and the first base station that is larger than the second uplink timing gap. The operations of 2115 may be performed according to the methods described herein. In some examples, aspects of the operations of 2115 may be performed by an MCG timing gap component as described with reference to FIGS. 10 through 13.

At 2120, the base station may communicate with the UE based on the first uplink timing gap. The operations of 2120 may be performed according to the methods described herein. In some examples, aspects of the operations of 2120 may be performed by a dual connectivity communication component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   establishing communications with a first base station and a second base station in accordance with a dual connectivity configuration, wherein the first base station is associated with a master cell group for the dual connectivity configuration and the second base station is associated with a secondary cell group for the dual connectivity configuration;
   receiving an indication of a minimum uplink timing gap for communications with the first base station when in the dual connectivity configuration;
   receiving, from the first base station, an indication of an uplink timing gap that is smaller than the minimum uplink timing gap;
   determining a first uplink timing gap for communications with the first base station, wherein the first uplink timing gap is equal to the minimum uplink timing gap and is larger than a second uplink timing gap for communications with the second base station based at least in part on the first base station being associated with the master cell group for the dual connectivity configuration;
   assigning a first priority to transmit power determinations for uplink communications with the first base station, wherein the first priority is higher than a second priority associated with transmit power determinations for uplink communications with the second base station; and
   communicating with the first base station based at least in part on the first uplink timing gap and the first priority and with the second base station based at least in part on the second uplink timing gap and the second priority.

2. The method of claim 1, further comprising:
   receiving, from the first base station, an indication of a set of uplink timing gaps that is based at least in part on the dual connectivity configuration, wherein a smallest entry in the set of uplink timing gaps is configured to be larger than the second uplink timing gap; and
   receiving, from the first base station, an indication of the first uplink timing gap, wherein the indication comprises an index for the set of uplink timing gaps.

3. The method of claim 1, further comprising:
   reporting a capability of the UE to the first base station, wherein the minimum uplink timing gap is based at least in part on the capability.

4. The method of claim 1, wherein the second uplink timing gap and the first uplink timing gap are for a first type of communications, further comprising:
   determining a third uplink timing gap for a second type of communications with the second base station, wherein the first uplink timing gap is determined to be larger than the third uplink timing gap.

5. The method of claim 1, wherein the first uplink timing gap is larger than a timing gap for communications with the first base station when the UE is not in the dual connectivity configuration.

6. The method of claim 1, wherein:
   the first uplink timing gap comprises a gap between receiving a downlink transmission from the first base station and transmitting a corresponding uplink transmission to the first base station; and
   the second uplink timing gap comprises a gap between receiving a downlink transmission from the second base station and transmitting a corresponding uplink transmission to the second base station.

7. The method of claim 1, wherein:
   the first uplink timing gap comprises a gap between receiving a downlink transmission from the first base station and transmitting a corresponding uplink transmission to the first base station; and
   the second uplink timing gap comprises a gap between determining a transmit power for an uplink transmission to the second base station and transmitting the uplink transmission to the second base station.

8. The method of claim 1, wherein:
   the first uplink timing gap comprises a gap between determining a transmit power for an uplink transmission to the first base station and transmitting the uplink transmission to the first base station; and the second uplink timing gap comprises a gap between determining a transmit power for an uplink transmission to the second base station and transmitting the uplink transmission to the second base station.

9. The method of claim 1, further comprising:
determining that an uplink transmission to the first base station and an uplink transmission to the second base station at least partially overlap in time.

10. The method of claim 1, wherein communicating with the first base station based at least in part on the first priority and with the second base station based at least in part on the second priority comprises:
determining a first transmit power for an uplink transmission to the first base station; and
determining a second transmit power for an uplink transmission to the second base station based at least in part on a difference between a transmit power limit and the first transmit power.

11. A method for wireless communications at a first base station, comprising:
establishing communications with a user equipment (UE) that is in a dual connectivity configuration, wherein the first base station is associated with a master cell group for the dual connectivity configuration and a second base station is associated with a secondary cell group for the dual connectivity configuration;
identifying a second uplink timing gap for communications between the UE and the second base station;
transmitting an indication of a minimum uplink timing gap for communications between the UE and the first base station when in the dual connectivity configuration;
determining a first uplink timing gap for communications between the UE and the first base station that is equal to the minimum uplink timing gap and is larger than the second uplink timing gap based at least in part on the first base station being associated with the master cell group for the dual connectivity configuration; and
communicating with the UE based at least in part on the first uplink timing gap.

12. The method of claim 11, further comprising:
determining a set of uplink timing gaps based at least in part on the dual connectivity configuration, wherein the set of uplink timing gaps is configured to have a smallest entry that is larger than the second uplink timing gap;
transmitting, to the UE, an indication of the set of uplink timing gaps; and
transmitting, to the UE, an indication of the first uplink timing gap, wherein the indication comprises an index for the set of uplink timing gaps.

13. The method of claim 11, wherein identifying the second uplink timing gap further comprises:
communicating with the second base station over a backhaul link; and
receiving an indication of the second uplink timing gap based at least in part on the communicating with the second base station.

14. The method of claim 11, wherein the second uplink timing gap and the first uplink timing gap are for a first type of communications, further comprising:
identifying a third uplink timing gap for a second type of communications between the UE and the second base station; and determining the first uplink timing gap to be larger than the third uplink timing gap.

15. The method of claim 11, wherein the first uplink timing gap is larger than an uplink timing gap for communications between the first base station and the UE when the UE is not in the dual connectivity configuration.

16. The method of claim 11, further comprising:
transmitting, to the UE, an indication of a first priority for transmit power determinations for uplink communications with the first base station, wherein the first priority is higher than a second priority associated with transmit power determinations for uplink communications with the second base station.

17. An apparatus for wireless communications at a user equipment (UE), comprising:
a processor,
memory in electronic communication with the processor; and
instructions stored in the memory and executable by the processor to cause the apparatus to:
establish communications with a first base station and a second base station in accordance with a dual connectivity configuration, wherein the first base station is associated with a master cell group for the dual connectivity configuration and the second base station is associated with a secondary cell group for the dual connectivity configuration;
receive an indication of a minimum uplink timing gap for communications with the first base station when in the dual connectivity configuration;
receive, from the first base station, an indication of an uplink timing gap that is smaller than the minimum uplink timing gap;
determine a first uplink timing gap for communications with the first base station, wherein the first uplink timing gap is equal to the minimum uplink timing gap and is larger than a second uplink timing gap for communications with the second base station based at least in part on the first base station being associated with the master cell group for the dual connectivity configuration;
assign a first priority to transmit power determinations for uplink communications with the first base station, wherein the first priority is higher than a second priority associated with transmit power determinations for uplink communications with the second base station; and
communicate with the first base station based at least in part on the first uplink timing gap and the first priority and with the second base station based at least in part on the second uplink timing gap and the second priority.

18. The apparatus of claim 17, wherein the instructions are further executable by the processor to cause the apparatus to:
receive, from the first base station, an indication of a set of uplink timing gaps that is based at least in part on the dual connectivity configuration, wherein a smallest entry in the set of uplink timing gaps is configured to be larger than the second uplink timing gap; and
receive, from the first base station, an indication of the first uplink timing gap, wherein the indication comprises an index for the set of uplink timing gaps.

19. The apparatus of claim 17, wherein the first uplink timing gap is larger than a timing gap for communications with the first base station when the UE is not in the dual connectivity configuration.

20. The apparatus of claim 17, wherein the instructions for communicating with the first base station based at least in part on the first priority and with the second base station based at least in part on the second priority are executable by the processor to cause the apparatus to:
  determine a first transmit power for an uplink transmission to the first base station; and
  determine a second transmit power for an uplink transmission to the second base station based at least in part on a difference between a transmit power limit and the first transmit power.

21. The apparatus of claim 17, wherein the instructions are further executable by the processor to cause the apparatus to:
  report a capability of the UE to the first base station, wherein the minimum uplink timing gap is based at least in part on the capability.

22. The apparatus of claim 17, wherein the second uplink timing gap and the first uplink timing gap are for a first type of communications, and wherein the instructions are further executable by the processor to cause the apparatus to:
  determine a third uplink timing gap for a second type of communications with the second base station, wherein the first uplink timing gap is determined to be larger than the third uplink timing gap.

23. The apparatus of claim 17, wherein:
  the first uplink timing gap comprises a gap between receiving a downlink transmission from the first base station and transmitting a corresponding uplink transmission to the first base station; and
  the second uplink timing gap comprises a gap between receiving a downlink transmission from the second base station and transmitting a corresponding uplink transmission to the second base station.

24. The apparatus of claim 17, wherein:
  the first uplink timing gap comprises a gap between receiving a downlink transmission from the first base station and transmitting a corresponding uplink transmission to the first base station; and
  the second uplink timing gap comprises a gap between determining a transmit power for an uplink transmission to the second base station and transmitting the uplink transmission to the second base station.

25. The apparatus of claim 17, wherein:
  the first uplink timing gap comprises a gap between determining a transmit power for an uplink transmission to the first base station and transmitting the uplink transmission to the first base station; and
  the second uplink timing gap comprises a gap between determining a transmit power for an uplink transmission to the second base station and transmitting the uplink transmission to the second base station.

26. The apparatus of claim 17, wherein the instructions for communicating with the first base station based at least in part on the first priority and with the second base station based at least in part on the second priority are executable by the processor to cause the apparatus to:
  determine a first transmit power for an uplink transmission to the first base station; and
  determine a second transmit power for an uplink transmission to the second base station based at least in part on a difference between a transmit power limit and the first transmit power.

27. An apparatus for wireless communications at a first base station, comprising:
  a processor,
  memory in electronic communication with the processor; and
  instructions stored in the memory and executable by the processor to cause the apparatus to:
    establish communications with a user equipment (UE), wherein the first base station is associated with a master cell group for a dual connectivity configuration and a second base station is associated with a secondary cell group for the dual connectivity configuration;
    identify a second uplink timing gap for communications between the UE and the second base station;
    transmit an indication of a minimum uplink timing gap for communications between the UE and the first base station when in the dual connectivity configuration;
    determine a first uplink timing gap for communications between the UE and the first base station that is equal to the minimum uplink timing gap and is larger than the second uplink timing gap based at least in part on the first base station being associated with the master cell group for the dual connectivity configuration; and
    communicate with the UE based at least in part on the first uplink timing gap.

28. The apparatus of claim 27, wherein the instructions for identifying the second uplink timing gap are executable by the processor to cause the apparatus to:
  communicate with the second base station over a backhaul link; and
  receive an indication of the second uplink timing gap based at least in part on the communicating with the second base station.

29. The apparatus of claim 27, wherein the instructions are further executable by the processor to cause the apparatus to:
  transmit, to the UE, an indication of a first priority for transmit power determinations for uplink communications with the first base station, wherein the first priority is higher than a second priority associated with transmit power determinations for uplink communications with the second base station.

30. The apparatus of claim 27, wherein the instructions are further executable by the processor to cause the apparatus to:
  determine a set of uplink timing gaps based at least in part on the dual connectivity configuration, wherein the set of uplink timing gaps is configured to have a smallest entry that is larger than the second uplink timing gap;
  transmit, to the UE, an indication of the set of uplink timing gaps; and
  transmit, to the UE, an indication of the first uplink timing gap, wherein the indication comprises an index for the set of uplink timing gaps.

31. The apparatus of claim 27, wherein the second uplink timing gap and the first uplink timing gap are for a first type of communications, and wherein the instructions are further executable by the processor to cause the apparatus to:
  identify a third uplink timing gap for a second type of communications between the UE and the second base station; and
  determine the first uplink timing gap to be larger than the third uplink timing gap.

32. The apparatus of claim 27, wherein the first uplink timing gap is larger than an uplink timing gap for communications between the first base station and the UE when the UE is not in the dual connectivity configuration.

\* \* \* \* \*